United States Patent
Omote

(10) Patent No.: US 11,478,704 B2
(45) Date of Patent: Oct. 25, 2022

(54) IN-GAME VISUALIZATION OF SPECTATOR FEEDBACK

(71) Applicant: Sony Interactive Entertainment Inc., Tokyo (JP)

(72) Inventor: Masanori Omote, San Mateo, CA (US)

(73) Assignee: Sony Interactive Entertainment Inc., Tokyo (JP)

(*) Notice: Subject to any disclaimer, the term of this patent is extended or adjusted under 35 U.S.C. 154(b) by 64 days.

(21) Appl. No.: 17/089,650

(22) Filed: Nov. 4, 2020

(65) Prior Publication Data

US 2022/0134225 A1    May 5, 2022

(51) Int. Cl.
| | |
|---|---|
| A63F 13/53 | (2014.01) |
| A63F 13/577 | (2014.01) |
| A63F 13/86 | (2014.01) |
| G06T 3/40 | (2006.01) |
| G06T 11/00 | (2006.01) |
| G06T 11/20 | (2006.01) |

(Continued)

(52) U.S. Cl.
CPC ............ *A63F 13/53* (2014.09); *A63F 13/577* (2014.09); *A63F 13/86* (2014.09); *G06T 3/40* (2013.01); *G06T 11/001* (2013.01); *G06T 11/203* (2013.01); *G06T 13/80* (2013.01); *G10L 15/26* (2013.01); *G10L 25/63* (2013.01); *A63F 13/812* (2014.09); *A63F 2300/303* (2013.01); *A63F 2300/577* (2013.01); *A63F 2300/643* (2013.01); *A63F 2300/8011* (2013.01)

(58) Field of Classification Search
None
See application file for complete search history.

(56) References Cited

U.S. PATENT DOCUMENTS

| | | |
|---|---|---|
| 7,458,894 B2 | 12/2008 | Danieli et al. |
| 8,886,530 B2 | 11/2014 | Nakadai |

(Continued)

OTHER PUBLICATIONS

PCT/US2021/055098, Notification of Transmittal of the International Search Report and the Written Opinion of the International Searching Authority, or the Declaration, PCT/ISA/220, and the International Search Report, PCT/ISA/210, dated Jan. 24, 2022.

*Primary Examiner* — Jason T Yen
(74) *Attorney, Agent, or Firm* — Penilla IP, APC

(57) ABSTRACT

Methods and systems are provided for displaying voice input of a spectator in a video game. The method includes receiving, by a server, the voice input produced by the spectator while viewing video game video of the video game. The method includes examining, by the server, the voice input to identify speech characteristics associated with the voice input of the spectator. The method includes processing, by the server, the voice input to generate a spectator video that includes text images representing the voice input of the spectator. In one embodiment, the text images are configured to be adjusted in visual appearance based on the speech characteristics of the voice input, wherein the text images are directed in a field of view of an avatar of the spectator. The method includes combining, by the server, video game video with the spectator video to produce an overlay of the text images graphically moving in toward a game scene provided by the video game video. The method includes sending, to a client device, a spectator video stream that includes the overlay of the text images.

19 Claims, 14 Drawing Sheets

(51) Int. Cl.
    *G06T 13/80*     (2011.01)
    *G10L 15/26*     (2006.01)
    *G10L 25/63*     (2013.01)
    *A63F 13/812*    (2014.01)

(56) References Cited

U.S. PATENT DOCUMENTS

| | | |
|---|---|---|
| 10,162,594 B2 | 12/2018 | Taki et al. |
| 10,299,008 B1* | 5/2019 | Catalano ............... G06K 9/627 |
| 2006/0025214 A1 | 2/2006 | Smith |
| 2006/0058103 A1 | 3/2006 | Danieli et al. |
| 2009/0085918 A1* | 4/2009 | Hollingworth ........... G06T 3/40 |
| | | 345/475 |
| 2009/0307595 A1* | 12/2009 | Clark ..................... G06N 3/006 |
| | | 715/728 |
| 2010/0146419 A1* | 6/2010 | Castelli .................. G06T 13/40 |
| | | 715/764 |
| 2010/0173708 A1* | 7/2010 | Yamakawa ............. A63F 13/12 |
| | | 463/43 |
| 2012/0330659 A1 | 12/2012 | Nakadai |
| 2014/0018165 A1 | 1/2014 | Kem et al. |
| 2017/0282077 A1 | 10/2017 | de la Cruz |
| 2017/0282079 A1 | 10/2017 | de la Cruz |
| 2017/0337034 A1 | 11/2017 | Taki et al. |
| 2019/0262723 A1* | 8/2019 | Trombetta ............ A63F 13/355 |
| 2019/0306586 A1* | 10/2019 | Rasool ............... H04N 21/4532 |
| 2020/0001183 A1 | 1/2020 | de la Cruz |
| 2021/0142820 A1* | 5/2021 | Raikar ................... G06F 40/30 |

\* cited by examiner

Speech Intensity Table — 918

| Spectator | Time | Walla | Speech Characteristics | | | | |
|---|---|---|---|---|---|---|---|
| | | | Sound Intensity Level Weighting | Size | Thickness | Distance Projected (feet) | Fade Time (seconds) |
| Spectator 1 | t1 | Yes! | 8 | 4 | 3 | 4 | 110 | 9 |
| | t2 | Let's Go Sangal | 8 | 6 | 5 | 7 | 150 | 13 |
| | t3 | You can do it | 3 | 1 | 2 | 2 | 6 | 5 |
| | tn | Defense, Defense, Defense | 5 | 2 | 3 | 4 | 10 | 7 |
| Spectator 2 | t1 | Shoot the ball | 8 | 6 | 6 | 7 | 90 | 9 |
| | t2 | 3 more minutes to go! | 7 | 4 | 5 | 5 | 75 | 10 |
| | t3 | No! | 8 | 8 | 7 | 6 | 105 | 20 |
| | tn | Booooo!! | 9 | 7 | 7 | 6 | 75 | 18 |
| Spectator 3 | t1 | Come on boys, you got this | 5 | 2 | 4 | 3 | 40 | 8 |
| | t2 | Whoa, nice move | 4 | 1 | 3 | 2 | 35 | 5 |
| | t3 | Goal!!!!! | 10 | 8 | 10 | 8 | 210 | 25 |
| | tn | Don't give up | 6 | 5 | 4 | 4 | 65 | 10 |
| Spectator N | t1 | Let's go Antlers | 2 | 2 | 2 | 1 | 5 | 4 |
| | t2 | MVP! | 4 | 4 | 3 | 2 | 15 | 7 |
| | t3 | Yes, we're up by 2 goals | 3 | 2 | 2 | 1 | 10 | 6 |
| | tn | I believe in you Antlers | 2 | 1 | 2 | 1 | 5 | 4 |

FIG. 9A

Emotion to Color Mapping

| Emotion Category | Emotion type | Color |
|---|---|---|
| Happy | Fulfilled | Green |
| | Glad | |
| | Satisfied | |
| | Pleased | |
| Excited | Energetic | Orange |
| | Ecstatic | |
| | Bouncy | |
| | Perky | |
| Scared | Tense | Yellow |
| | Nervous | |
| | Anxious | |
| | Terrified | |
| Angry | Irritated | Red |
| | Upset | |
| | Mad | |
| | Furious | |

FIG. 9B

IN-GAME VISUALIZATION OF SPECTATOR FEEDBACK

BACKGROUND

1. Field of the Disclosure

The present disclosure relates generally to incorporating spectator comments in a video game, and more particularly to methods and systems for displaying voice input of a spectator in a video game.

2. Description of the Related Art

The video game industry has seen many changes over the years. In particular, online gaming and live-streaming events such as E-sports have seen a tremendous growth in terms of the number of live events, viewership, and revenue. Consequently, as online gaming and live-streaming events continue to grow in popularity, there has been a tremendous growth in spectators (e.g., online viewers) who are accessing the online gaming content to view the gaming content.

A growing trend in in the video game industry is to improve and develop unique ways that will enhance the experience of spectators and others (e.g., players, commentators, etc.) viewing the online gaming content. For example, when a spectator is viewing the online gaming content, the spectator can comment on the content and communicate with other viewers (e.g., other spectators, players, commentators, etc.) by typing their comments into a chat room. Unfortunately, when multiple spectators and viewers simultaneous commenting and engaging in conversation via the chat room, the chat room can become over congested and it may be difficult to keep track of all the comments submitted by the spectators and viewers. As a result, the spectators and the viewers might find it ineffective to submit their comments into the chat room because it might not be seen by their intended target.

It is in this context that implementations of the disclosure arise.

SUMMARY

Implementations of the present disclosure include methods, systems, and devices relating to displaying voice input of a spectator in a video game. In some embodiments, methods are disclosed to enable spectator comments to be visually displayed in a video game, where text images representing the spectator comments appear in a video game that the spectator is viewing. For example, spectators who are viewing the gameplay of players competing in an E-sports event may be interested in commenting on the gameplay and cheering for their favorite team. Instead of limiting the spectators to submitting their comments to a chat room, the methods disclosed herein outline ways of presenting the spectator comments visually so that the spectator comments appear within the gameplay and be seen by the viewers of the video game. Thus, when spectators comment and react to various activities occurring in the gameplay, their comments can be depicted in the scenes of the gameplay and an avatar of the spectator is depicted verbally expressing the comments of the spectator. In some embodiments, the spectator comments (e.g., voice input) can be examined to identify speech characteristics associated with the voice input of the spectator such as a sound intensity level, emotion, mood, etc. In one embodiment, using the speech characteristics associated with the voice input of the spectator, text images representing the voice input of the spectator can be generated and displayed in the scenes of the gameplay.

In one embodiment, a method for displaying voice input of a spectator in a video game is provided. The method includes receiving, by a server, the voice input produced by the spectator while viewing video game video of the video game. The method includes examining, by the server, the voice input to identify speech characteristics associated with the voice input of the spectator. The method includes processing, by the server, the voice input to generate a spectator video that includes text images representing the voice input of the spectator. In one embodiment, the text images are configured to be adjusted in visual appearance based on the speech characteristics of the voice input, wherein the text images are directed in a field of view of an avatar of the spectator. The method includes combining, by the server, video game video with the spectator video to produce an overlay of the text images graphically moving in toward a game scene provided by the video game video. The method includes sending, to a client device, a spectator video stream that includes the overlay of the text images. In this way, the voice input of spectators viewing a video game can be displayed and incorporated into the scenes of the video game so that it can be seen by seen by various individuals viewing the video game.

In another embodiment, a method for displaying a plurality of voice inputs of a plurality of spectators of a video game is provided. The method includes receiving, by the server, the plurality of voice inputs produced by the plurality of spectators. The method includes examining, by the server, the plurality of voice inputs to identify corresponding speech characteristics of the plurality of spectators. The method includes processing, by the server, the plurality of voice inputs to generate a spectator video that includes corresponding text images directed a field of view of respective avatars of the plurality of spectators. The method includes combining, video game video with the spectator video to produce overlays of the corresponding text images. The method includes sending, to a plurality of client devices, a spectator video stream that includes the overlays of the corresponding text images.

In another embodiment, a method for displaying voice input of a spectator in a video game is provided. The method includes receiving, by a server, the voice input produced by the spectator while viewing video game video of the video game. The method includes examining, by the server, the voice input to identify speech characteristics associated with the voice input of the spectator. The method includes processing, by the server, the voice input to generate a spectator video that includes text images representing the voice input of the spectator. The text images are configured to be adjusted in visual appearance based on the speech characteristics of the voice input wherein the text images are directed in a field of view of an avatar of the spectator. The method includes associating, by the server, the video game video with the spectator video to enable generation of an overlay of the text images graphically moving in toward a game scene provided by the video game video. The method includes enabling a client device of the spectator to render a spectator video stream that includes the video game video along with the overlay of the text images.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which:

FIG. 9A illustrates an embodiment of a speech intensity table illustrating various walla (e.g. voice input) produced by a plurality of spectators, in accordance with an implementation of the disclosure.

FIG. 9B illustrates an embodiment of an emotion to color mapping table which can be used to determine the color of the text images representing the walla, in accordance with an implementation of the disclosure.

DETAILED DESCRIPTION

Figure 1:
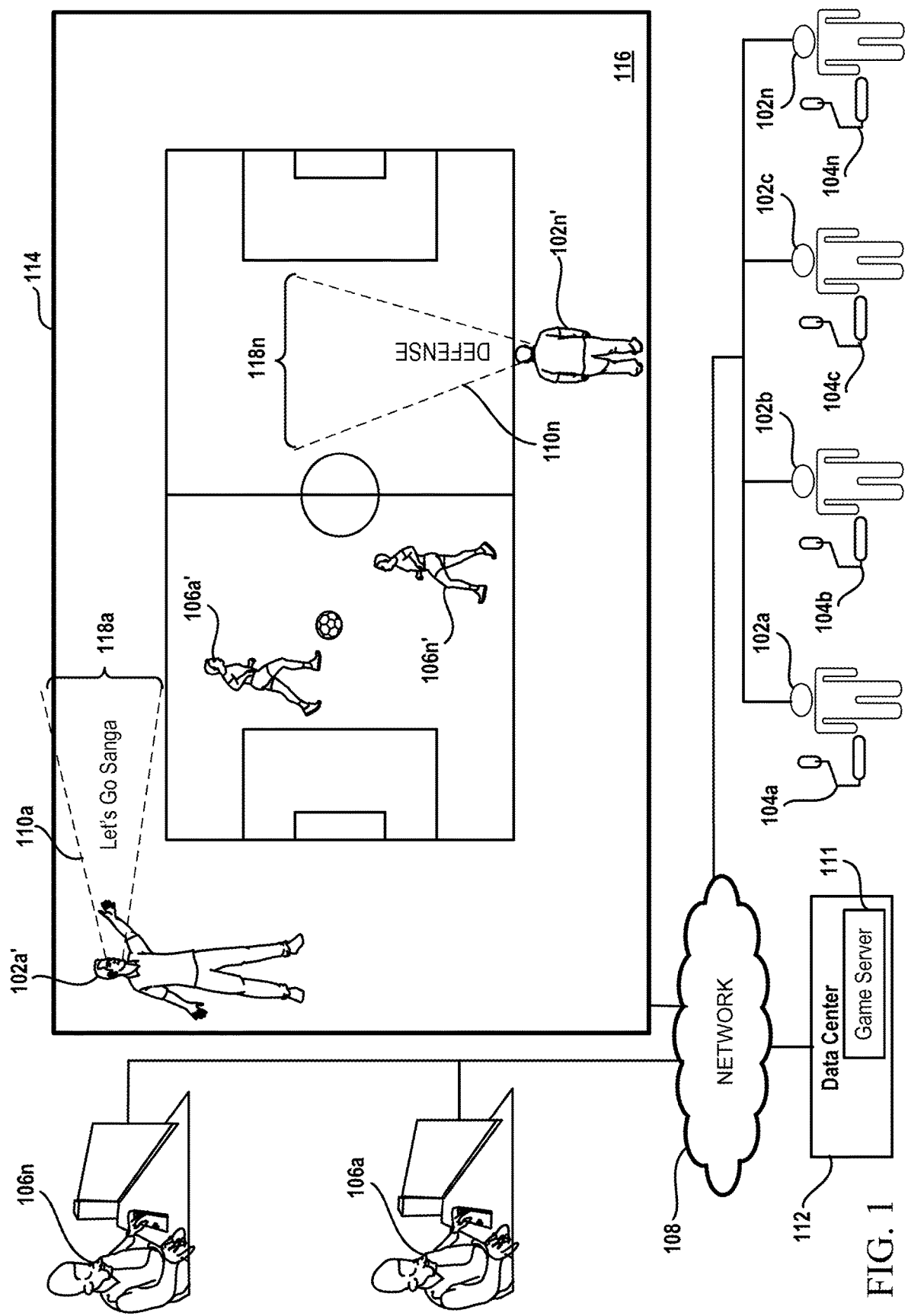
FIG. 1 illustrates an embodiment of a system configured to execute a gameplay for a plurality of players and to process walla produced by a plurality of spectators in order to display text images representing the walla in the scene of the gameplay, in accordance with an implementation of the disclosure.

The following implementations of the present disclosure provide methods, systems, and devices for displaying voice input of a spectator in a video game. In particular, while viewing the gameplay of players playing a video game, spectators may comment and react to what is occurring in the gameplay. The comments and verbal reactions of the spectators can be depicted in the scenes of the gameplay and an avatar of the spectator is depicted verbalizing the comments of the spectator. This facilitates an in-game visualization of the spectator comments which can be seen and heard by viewers viewing the gameplay. For example, while watching an E-sports event that involves a soccer match, a spectator can comment on the gameplay and verbally cheer for their favorite players and team. The spectator comments are processed and text images representing the spectator comments are displayed within the scenes of the gameplay which can be seen by the players competing in the game and other spectators viewing the game. Generally, the methods described herein provides a way for spectator comments to be visually depicted in the game scenes which in turn can enhance viewer engagement and can further improve communication amongst all the individuals viewing and participating in the gameplay.

As used herein, the term "walla" should be broadly understood to refer to the in-game visualization of sound or speech (e.g., talking, signing, laughing, crying, screaming, shouting, yelling, etc.) produced by spectators of a game. In one embodiment, the spectators may be a person or a combination of people which may be visually depicted (e.g., as characters or avatars) in the scenes of a video game or any other media content. For purposes of clarity, references to "walla" should be taken in the general broad sense where spectator feedback and/or reaction to a game is visualized in-game, or in accordance with other specific examples described herein.

By way of example, in one embodiment, a method is disclosed that enables displaying voice input of a spectator in a video game. The method includes receiving, by a server, the voice input produced by one or more spectators while viewing video game video of the video game. In one embodiment, the method may further include examining, by the server, the voice input to identify speech characteristics associated with the voice input of the one or more spectators. In another embodiment, the method may include processing, by the server, the voice input to generate a spectator video that includes text images representing the voice input of the spectators. In one example, the text images can be configured to be adjusted in visual appearance based on the speech characteristics of the voice input. In another example, the text images are directed in a field of view of an avatar of the spectator. In some embodiments, the method includes combining, by the server, video game video with the spectator video to produce an overlay of the text images graphically moving in toward a game scene provided by the video game video. In another embodiment, the method includes sending, to a client device, a spectator video stream that includes the overlay of the text images. It will be obvious, however, to one skilled in the art that the present disclosure may be practiced without some or all of the specific details presently described. In other instances, well known process operations have not been described in detail in order not to unnecessarily obscure the present disclosure.

In accordance with one embodiment, a system is disclosed for displaying voice input of a spectator in a video game such as an online multiplayer video game. For example, a plurality of spectators may be connected to view a live gaming event such as an E-sports event. In one embodiment, the system includes a connection to a network. In some embodiments, a plurality of spectators can be connected over a network to view the players competing against one another in the live gaming event. In some embodiments, one or more data centers and game servers can execute the game and enable connections to a plurality of spectators and players when hosting the video game. The one or more game servers of the one or more data centers may be configured to receive, process, and execute data from a plurality of devices controlled by spectators and players.

In some embodiments, while viewing the live gaming event, the system can be configured to receive, process, and execute walla (e.g., voice input) produced by the spectators. For example, while watching a live E-sports event that includes a soccer game, a spectator may produce walla and verbally cheer for their favorite players and team by verbally expressing phrases such as "you can do it, don't give, up, goal!, defense, etc." Each walla produced by the spectator can be examined and processed by the system to generate text images representing the walla which can be visually depicted in the gaming event. In some embodiments, the corresponding text images representing the walla of the spectator can be incorporated into the scenes of the video game which can be seen by various individuals viewing the game, e.g., players, spectators, etc. In one embodiment, the text images representing the walla may be directed in a field of view of the spectator's avatar in the video game. In other embodiments, the visual appearance of the walla may vary and is based on the speech characteristics associated with the walla.

With the above overview in mind, the following provides several example figures to facilitate understanding of the example embodiments.

FIG. 1 illustrates an embodiment of a system configured to execute a gameplay for a plurality of players 106 and to process walla produced by a plurality of spectators 102 in order to display text images representing the walla in the scene of the gameplay. As noted above, walla refers to sound or speech produced by a person or a combination of people, e.g., talking, singing, laughing, crying, screaming, shouting, yelling, grunting, etc. In one embodiment, FIG. 1 illustrates spectators 102a-102n, players 106a-106n, a game server 111, a data center 112, and a network 108. The system of FIG. 1 may be referred to as a cloud gaming system, where multiple game servers 111 and data centers 112 can work together to provide wide access to spectators 102 and players 106 in a distributed and seamless fashion.

In some embodiments, the players 106 can be playing a multiplayer online game where they are teammates or on opposing teams competing against one another. Players 106 can be configured to send game commands to the game server 111 and data center 112 through the network 108. In one embodiment, the players 106 can be configured to receive encoded video streams and decode the video streams received by game server 111 and data center 112. In some embodiments, the video streams may be presented to players 106 on a display and/or a separate device such as a monitor or television. In some embodiments, the devices of the players can be any connected device having a screen and internet connection.

In some embodiments, the spectators 102 can be coupled to and can communicate with the data center 112 and the game server 111 through the network 108. The spectators 102 are configured to receive encoded video streams and decode the video streams received from the data center 112 and game server 111. The encoded video streams, for example, are provided by the cloud gaming system, while player and spectator devices provide inputs for interacting with the game. In one embodiment, the spectators 102 can receive video streams such as a video stream from a multiplayer online game that is being executed by players 106. In some embodiments, the video streams may be presented to the spectators 102 on a display of the spectator or on a separate device such as a monitor, or television or head mounted display, or portable device.

In some embodiments, a device such as microphone 104 can be used to capture the walla produced by the spectators 102 or sound from the environment where the spectators 102 are located. The walla captured by the microphones 104 can be examined to identify various speech characteristics associated with the walla. In some embodiments, the walla produced by each of the spectators 102 can be processed to generate text images representing the walla which can be displayed in the scenes of the gameplay and are viewable by the spectators and other individuals viewing the gameplay.

In one example, according to the embodiment shown in FIG. 1, the spectators 102 are shown connected and viewing the gameplay of players 106 on a display 114. As shown on the display 114, the gameplay of the players 106 illustrates a scene 116 of the players 106 playing a soccer game. As shown in the scene 116, player characters 106a'-106n' representing players 106a-106n are shown on the soccer field competing against each other in the game. During the progression of the gameplay, the players 106a-106n can control the various actions and movements of their corresponding player characters 106a'-106n' and the spectators 102 can view and react to what is occurring throughout the game.

As further illustrated in the scene 116, spectator avatars 102a'-102n' represent the spectators 102a-102n are shown along the terrace section of the soccer field watching the gameplay and cheering for their team. As noted above, when a spectator 102 speaks and produces walla, the walla produced by the spectator 102 is captured by the system and processed to generate text images representing the walla and the text images are displayed in a field of view of the spectator avatar associated with the spectator. For example, as shown in FIG. 1, while viewing the gameplay of the players, spectator 102a and spectator 102n may respectively verbally express the words "Let's GO Sanga" and "Defense" which are captured by microphones 104a and 104n. The walla (e.g., Let's Go Sanga, Defense) produced by the spectators 102 are processed and text images representing the walla are generated and displayed in the scene 116 of the gameplay. In particular, as shown in the scene 116, spectator avatar 102a' is shown verbally expressing the walla of spectator 102a (e.g., Let's Go Sanga) and text image 118a representing the walla is shown in the field of view 110a of the spectator avatar 102a'. As further illustrated in the scene 116, spectator avatar 102n' is shown verbally expressing the walla of spectator 102n (e.g., Defense) and text image 118n representing the walla is shown in the field of view 110n of the spectator avatar 102n'.

Figure 2A:
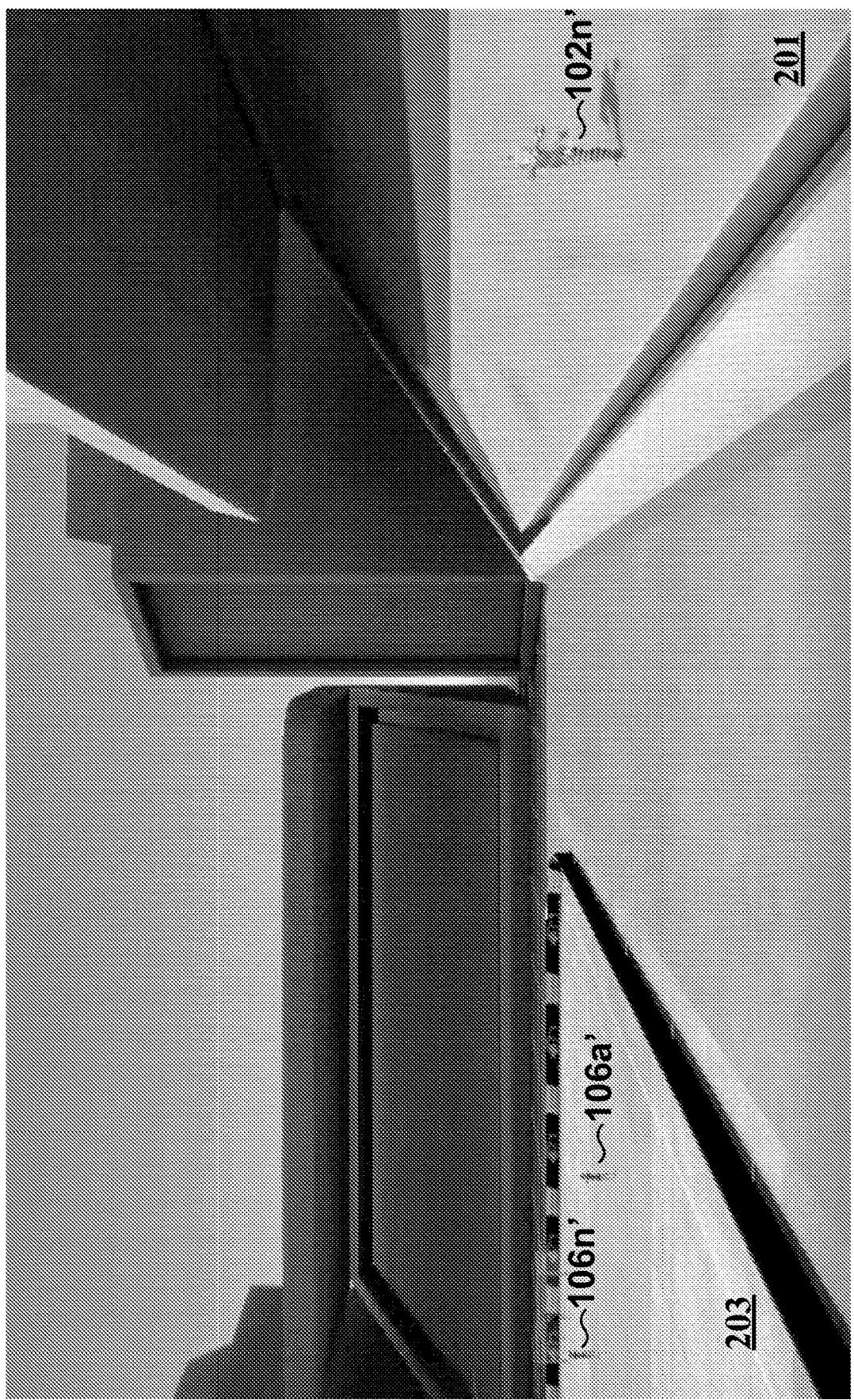
FIG. 2A illustrates an embodiment of a scene of a video game with a camera point of view (POV) that captures a unique view into the scene of the video game, in accordance with an implementation of the disclosure.

FIG. 2A illustrates an embodiment of a scene of a video game with a camera point of view (POV) that captures a unique view into the scene of the video game. As illustrated in FIG. 2A, the scene shows a gameplay involving a soccer match. As shown, a camera with a camera POV may be in a position that is pointed toward one end of the soccer stadium that is configured to capture a portion of a terrace 201 and a portion of the soccer field 203. A spectator avatar 102n' is shown in the terrace 201 watching the player characters 106a'-106n' compete in the soccer match. In some embodiments, the camera POV may be dynamically adjusted throughout the progression of the gameplay to provide each of the spectators 102a-102n with the most optimal view into the scene of the video game. For example, in one embodiment, the position of the camera may be adjusted so that the camera POV includes various viewpoints of the soccer stadium such as a bird's-eye view, a side-view, an upper-tier view, a lower-tier view, an end-view, or a zoomed-in view that captures a specific part of the gameplay.

Figure 2B:
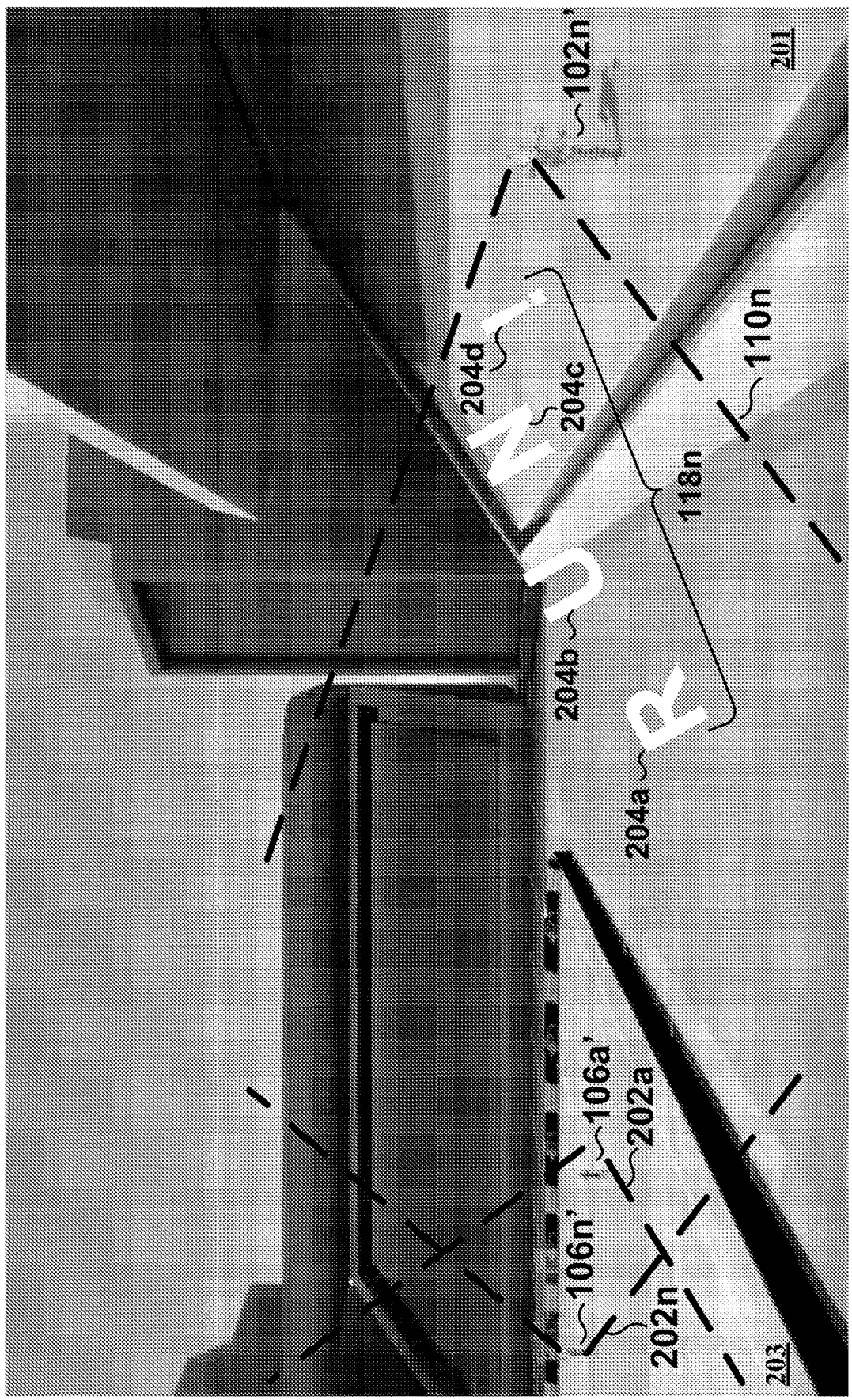
FIG. 2B illustrates an embodiment of the scene shown in FIG. 2A illustrating a spectator avatar verbally expressing the walla produced by spectator and the corresponding text image representing the walla, in accordance with an implementation of the disclosure.

FIG. 2B illustrates an embodiment of the scene shown in FIG. 2A illustrating a spectator avatar 102n' verbally expressing the walla produced by spectator 102n and the corresponding text image 118n representing the walla. As illustrated in FIG. 2B, a spectator avatar 102n' corresponding to spectator 102n is shown standing in the terrace 201 watching the player characters 106a'-106n' compete in a soccer match. In some embodiments, when the spectator 102n watches the gameplay and produces walla in response to the gameplay, the walla is processed and text images representing the walla is displayed in the field of view 110n of the spectator avatar 102n'. Since the spectator avatar 102n' represents the spectator 102n in the video game, when the spectator 102n speaks and produces walla, the spectator avatar 102n' also verbally expresses the same walla expressed by the spectator 102n. In the example shown in FIG. 2B, the spectator avatar 102n' is shown yelling, "RUN!," which corresponds to the walla produced by the spectator 102n. The text images are shown floating toward the game scene from a location associated with the spectator avatar 102n' viewing the game scene. As further illustrated, text images 118n representing the walla is displayed in a field of view 110n of the spectator avatar 102n' to depict the spectator avatar cheering for their team.

In one embodiment, the text images 118 can be made up of one or more glyphs 204. As used herein, the term "glyph" should be broadly understood to refer to a letter, character, symbol, mark, etc., or any combination thereof that is used to collectively represent a text image 118. In some embodiments, each glyph 204 may be configured to have specific shapes (e.g., 2-dimensional, 3-dimensional), sizes, fonts, colors, thicknesses or any other physical feature that can contribute to the overall appearance of the text image 118. Text images 118 and glyphs 204 are discussed in greater detail below with reference to FIG. 6.

As further illustrated in FIG. 2B, player characters 106a' and 106n' are shown on the soccer field 203 which can be controlled by players 106a and 106n during the gameplay. In some embodiments, player characters 106a' and 106n' may each have a corresponding field of view (FOV) 202 which allows the players to see the text images and objects within its FOV. In one embodiment, as the players 106 control the various movements and actions of their corresponding player characters 106' in the video game, the viewpoint that is observed by the player 106 is the same as the FOV of the player character 106' in the game. For example, as illustrated in FIG. 2B, player character 106n' is shown facing in a direction toward player character 106a' and the terrace 201. Since the FOV 202n of player character 106n' includes the player character 106a' and the text image 118n, player 102n can also view the player character 106a' and the text image 118n. In some cases, the viewpoint observed by the players 106 or the spectators 102 are not the same viewpoint that is provided by the FOV of the player characters 106' and the spectator avatars 102'. In some embodiments, different camera views may be provided as options to switch to, instead of just the FOV of the player characters 106' and the spectator avatars 102'.

Figure 2C:
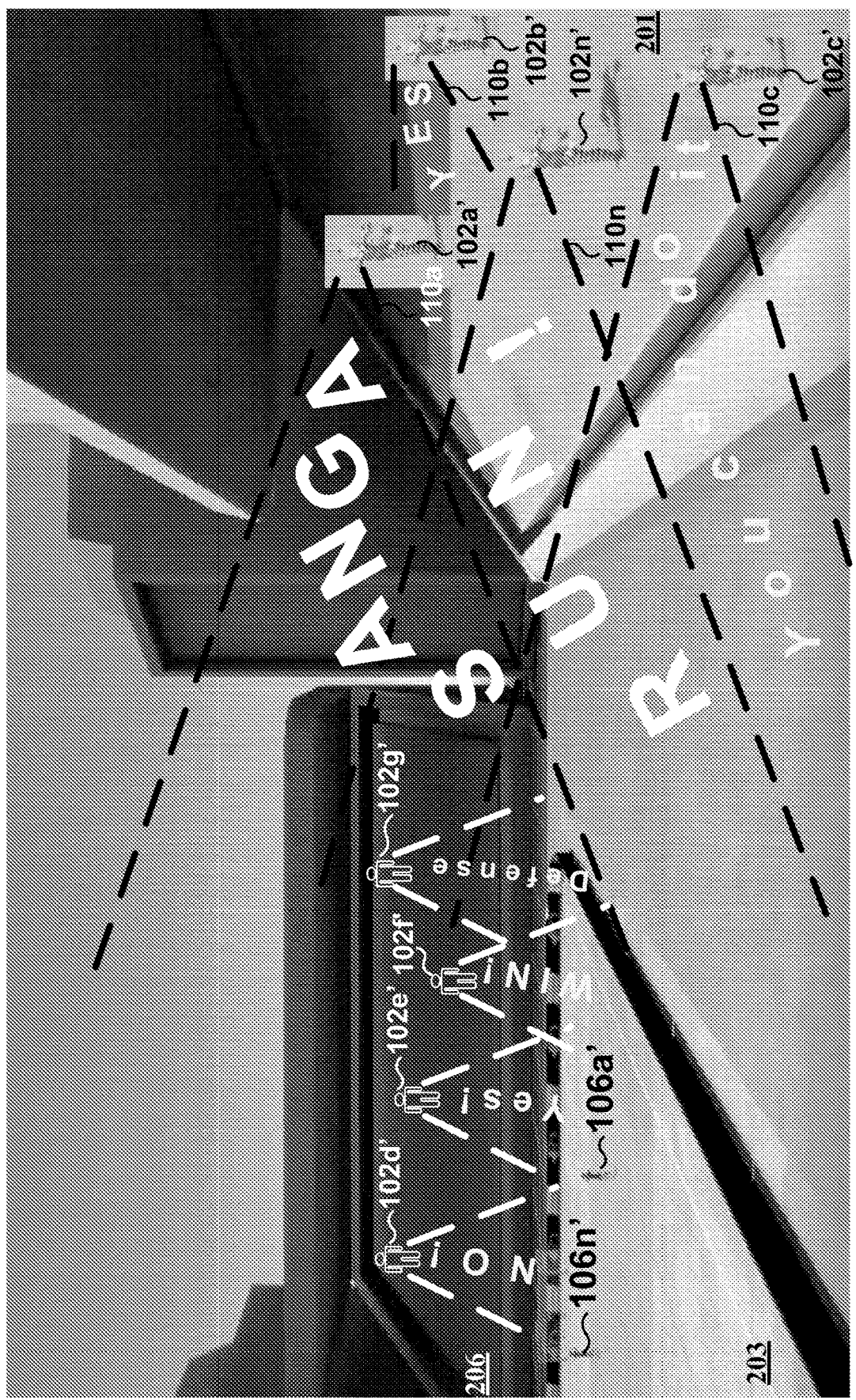
FIG. 2C illustrates an embodiment of the scene shown in FIG. 2A illustrating a plurality of spectator avatars verbally expressing the walla produced by the spectators and the corresponding text images representing the walla, in accordance with an implementation of the disclosure.

FIG. 2C illustrates an embodiment of the scene shown in FIG. 2A illustrating a plurality of spectator avatars 102a'-102n' verbally expressing the walla produced by spectators 102a-102n and the corresponding text images 118a-118n representing the walla. In some embodiments, a plurality of spectators 102a-102n may be viewing the gameplay of a video game and producing walla in response to the activity occurring in the gameplay. As noted above, the walla associated with each spectator is processed and text images representing the walla is visually depicted in the scene of the gameplay within a FOV of the corresponding avatar of the spectator. As illustrated in FIG. 2C, a plurality of spectator avatars 102' are shown standing in the terrace 201 watching the soccer game. Each spectator avatar 102' includes corresponding text images 118 that are directed in their field of view 110 which represents the walla produced by the corresponding spectators 102. For example, spectator avatar 102a' is shown verbally expressing the word, "Sanga," which is represented by text image 118a. Spectator avatar 102b' is shown verbally expressing the word, "YES," which is represented by text image 118b. Spectator avatar 102c' is shown verbally expressing the words, "You can do it," which is represented by text image 118c. Spectator avatar 102n' is shown verbally expressing the word, "RUN!," which is represented by text image 118n.

As further illustrated in FIG. 2C, spectator avatars 102d'-102g' are shown watching the gameplay from an end-zone terrace 206. As shown, the spectator avatars 102d'-102g' may have a corresponding FOV 110d-110g which includes text images 118 within its FOV representing the walla produced by their corresponding spectators 102. For example, spectator avatar 102d' is illustrated verbally expressing the word, "NO!," which is represented by text image 118d. Spectator avatar 102e' is illustrated verbally expressing the word, "Yes!," which is represented by text image 118e. Spectator avatar 102f' is illustrated verbally expressing the word, "WIN!," which is represented by text image 118f. Spectator avatar 102g' is illustrated verbally expressing the word, "Defense," which is represented by text image 118g.

Figure 3A:
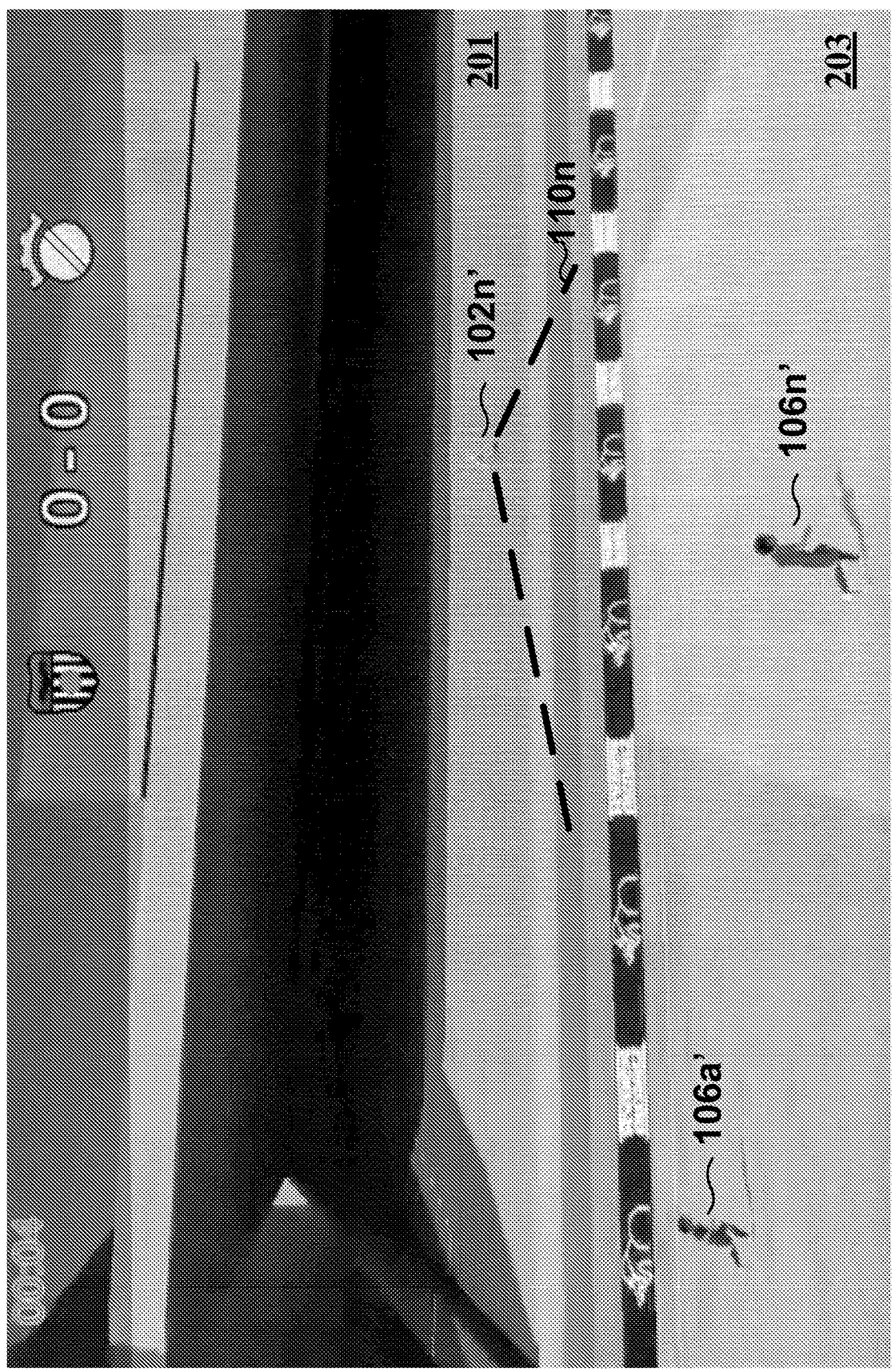
FIG. 3A illustrates an embodiment of a scene of a video game with a camera point of view (POV) that captures a side-view of the gameplay which includes a portion of the terrace and a portion of the soccer field, in accordance with an implementation of the disclosure.

FIG. 3A illustrates an embodiment of a scene of a video game with a camera point of view (POV) that captures a side-view of the gameplay which includes a portion of the terrace 201 and a portion of the soccer field 203. The scene shown in FIG. 3A provides an example illustrating that the camera POV can be dynamically adjusted to any position so that it provides each spectator with a unique viewpoint into the gameplay. As illustrated in FIG. 3A, the figure illustrates a viewpoint that is perceived by the spectator 102n which includes the spectator avatar 102' and the player characters 106a'-106n'. The figure illustrates the spectator avatar 102n' in the terrace 201 watching the player characters 106a'-106n' compete in the soccer match. In this example, the spectator 102n is not producing any walla. Accordingly, the spectator avatar 102n' is shown silently viewing the gameplay. In this embodiment, it is noted that the viewpoint of the spectator 102 and the POV of the spectator avatar 102' are different. Accordingly, the viewpoint of the spectator 102 may be different than the POV of the spectator avatar 102n', or in other cases can be aligned with one another.

Figure 3B:
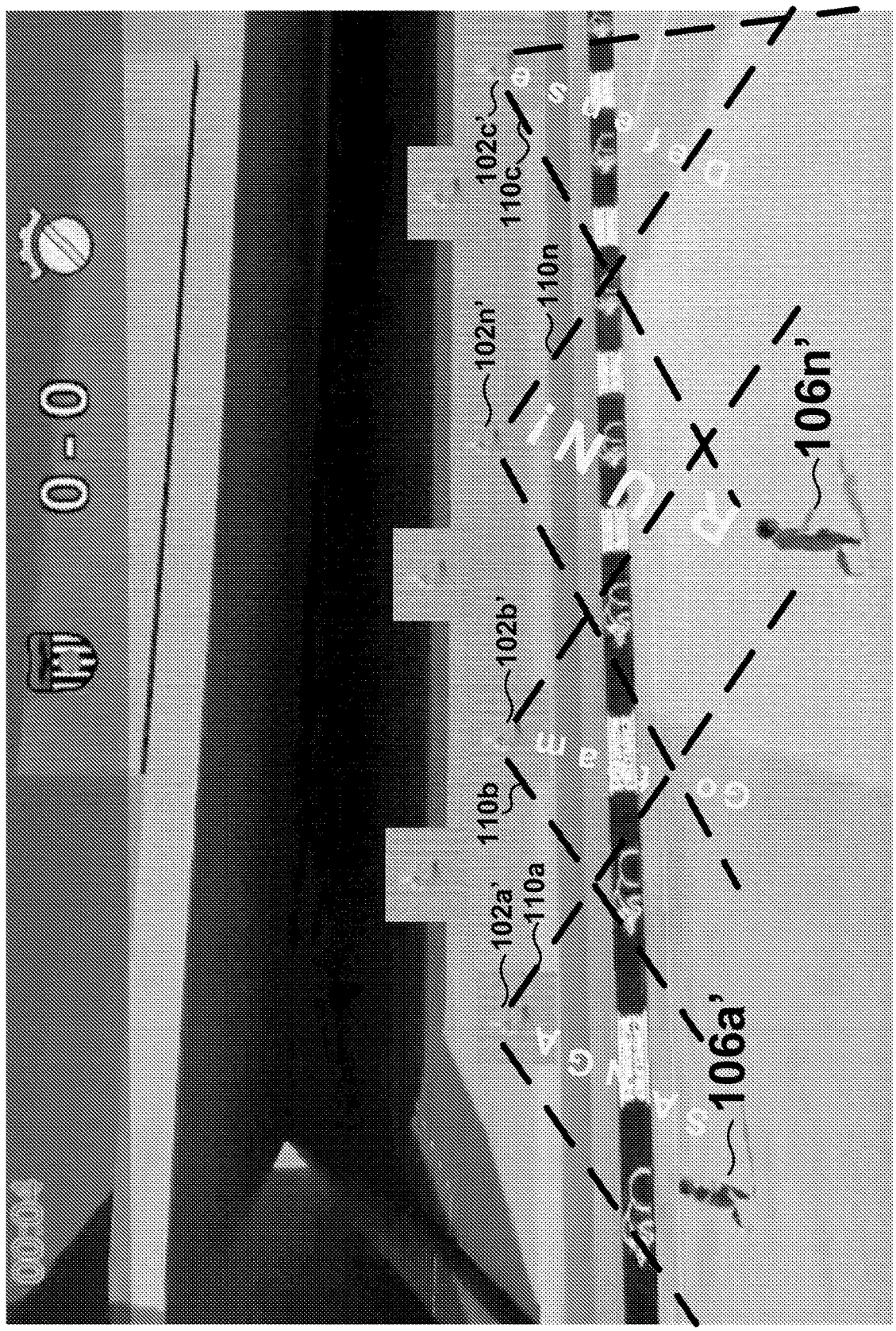
FIG. 3B illustrates an embodiment of the scene shown in FIG. 3A illustrating a plurality of spectator avatars verbally expressing the walla produced by the spectators and the corresponding text images representing the walla, in accordance with an implementation of the disclosure.

FIG. 3B illustrates an embodiment of the scene shown in FIG. 3A illustrating a plurality of spectator avatars 102a'-102n' verbally expressing the walla produced by the spectators and the corresponding text images 118a-118n representing the walla. As shown, each spectator avatar 102a'-102n' may have a corresponding FOV 110a-110n which includes text images representing the walla produced by its corresponding spectator 102. For example, spectator avatar 102a' is shown verbally expressing the word, "Sanga," which is represented by text image 118a. Spectator avatar 102b' is shown verbally expressing the words, "Go Team," which is represented by text image 118b. Spectator avatar 102c' is shown verbally expressing the word, "Defense," which is represented by text image 118c. Spectator avatar 102n' is shown verbally expressing the word, "RUN!," which is represented by text image 118n.

Figure 4:
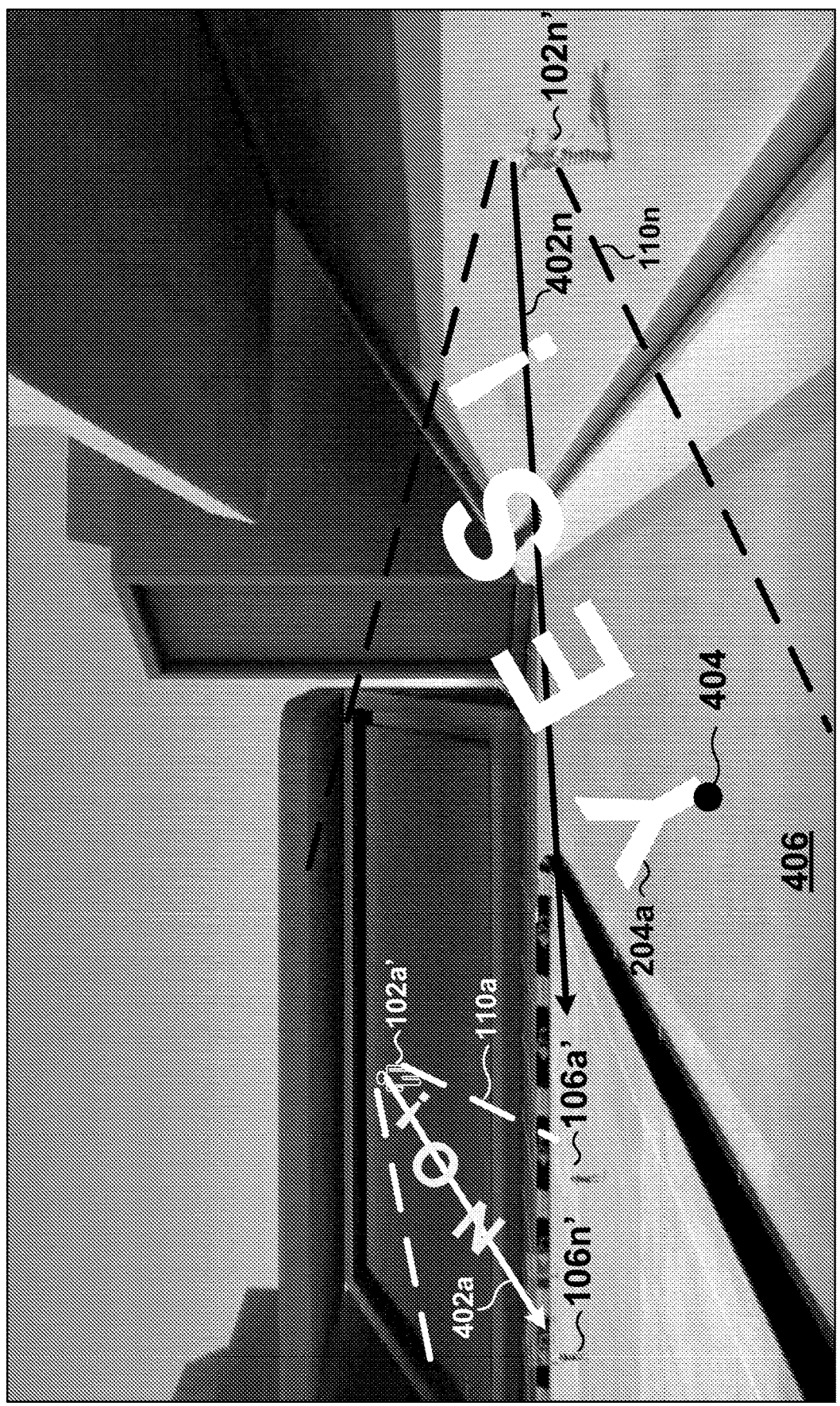
FIG. 4 illustrates an embodiment of a scene of a video game illustrating text images directed along a gaze direction of the spectator avatar, in accordance with an implementation of the disclosure.

FIG. 4 illustrates an embodiment of a scene of a video game illustrating text images 118 directed along a gaze direction 402 of the spectator avatars. In some embodiments, while viewing a gameplay of a video game, a camera that includes gaze tracking may be configured to capture images of the eyes of the spectator 102 to determine the gaze direction of the spectator 102 and the specific game content that the spectator 102 is focused on. In some embodiments, the gaze direction and the movements of the spectator 102 can be translated to the corresponding spectator avatar 102' of the spectator 102. Since the spectator avatar 102' represents the spectator 102 in the video game, the spectator avatar 102' mimics the same actions as the spectator, e.g., walla, gaze direction, movements, etc. For example, during the gameplay, the spectator 102 may have their gaze direction focused on their favorite players throughout the progression of the gameplay. Accordingly, as the spectator 102 makes various movements and focuses their attention on specific players in the game, the spectator avatar 102' associated with spectator 102 may also make the same movements and focus on the same players. In one example, as illustrated in FIG. 4, since the spectator 102n is looking toward the player character 106a', the spectator avatar 102n' is also looking toward the player character 106a' which is illustrated by the gaze direction 402n.

In some embodiments when a spectator 102 speaks and produces walla, the text images 118 representing the walla in the scene of the gameplay are directed along the gaze direction 402 of the corresponding spectator avatar 102'. For example, as shown in FIG. 4, when the spectator 102n verbally express the word, "YES!," the text image 118n representing the walla is shown within the FOV 110n of the spectator avatar 102n' and is directed along the gaze direction 402n. As further illustrated in FIG. 4, spectator avatar 102a' has a gaze direction 402a that is directed toward the player character 106n'. Accordingly, when the spectator 102a verbally express the word, "NO!," the text image 118a representing the walla is shown within the FOV 110a of the spectator avatar 102a' and is directed along the gaze direction 402a.

In some embodiments, the text images 118 representing the walla and each glyph 204 of the text images 118 may be assigned a physics parameter such as a weighting parameter. For example, each glyph 204 may be assigned to have a specified weighting parameter such as a mass and be subjected to the force of gravity. Referring to FIG. 4, the text image 118n (e.g., YES!) is shown projecting from the spectator avatar 102n'. The text image 118n is projected toward the soccer field at a specified distance and floats for a period of time before falling under the influence of gravity. As shown in FIG. 4, glyph 204a of the text image 118n contacts the surface 406 at collision point 404. In some embodiments, if a glyph 204 collides with an object in the game, the glyph may affect the gameplay. For example, when the glyph 204a collides with the surface 406 at collision point 404, the glyph 204a and the surface 406 may be damaged because of the collision. In another example, if the glyph 204a collides with a soccer ball in the gameplay, the soccer ball may be deflected a certain distance from the point of impact with the glyph 204a. In other embodiments, if weighting parameters are not be assigned to the glyphs 204 and the text images 118, the glyphs 204 and the text images 118 will not affect the gameplay when it collides with objects in the gameplay.

Figure 5A:
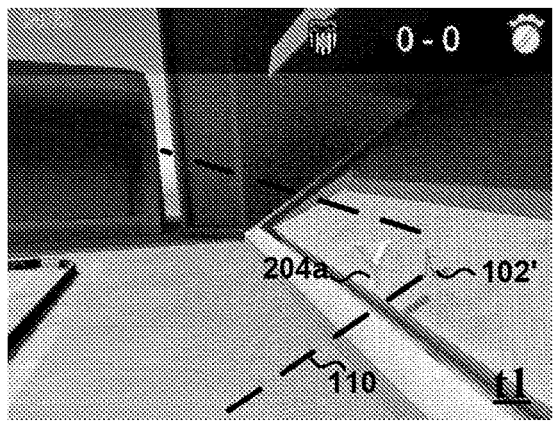
FIGS. 5A-5F illustrate a plurality of game scenes at various points in time and the text images representing the walla of the spectator, in accordance with an implementation of the disclosure.
Figure 5D:
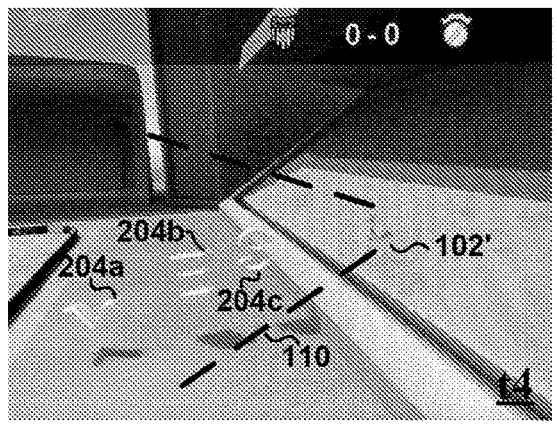
Figure 5B:
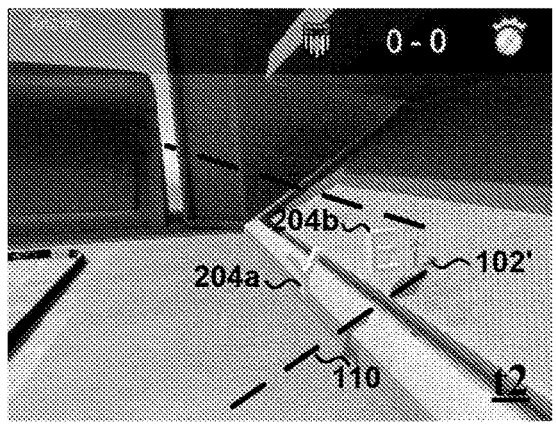
Figure 5E:
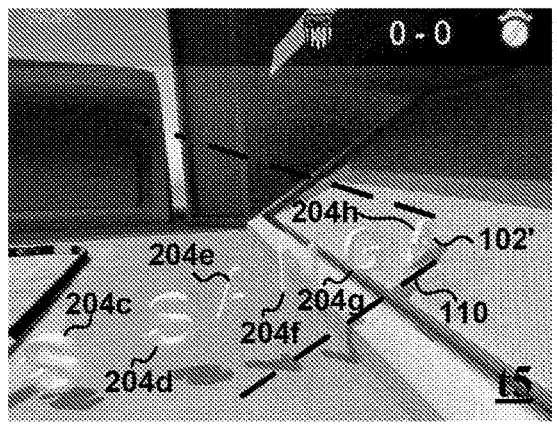
Figure 5C:
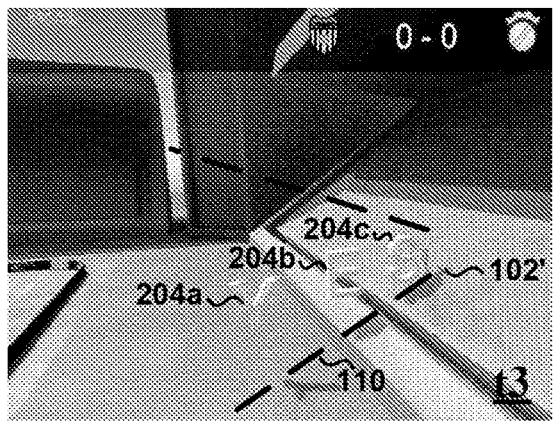
Figure 5F:
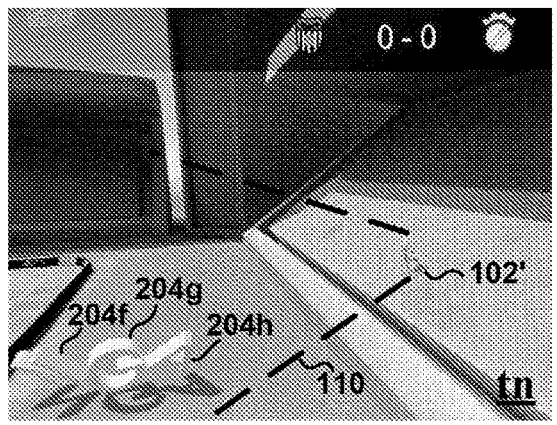

FIGS. 5A-5F illustrate a plurality of video game scenes at various points in time and the text images representing the walla of the spectator 102. As illustrated in FIGS. 5A-5F, the spectator avatar 102' is shown verbally expressing the words, "YES SANGA," which is represented by text images directed in the field of view of the spectator avatar 102'. As illustrated in the figures, the text images are represented by glyphs 204a-204h which appear in the game scenes at various points in time. For example, as illustrated in FIG. 5A, at time t1, glyph 204a (e.g., Y) is shown in the FOV of the spectator avatar 102'. As illustrated in FIG. 5B, at time t2, glyphs 204a-204b (e.g., YE) are shown in the FOV of the spectator avatar 102'. As illustrated in FIG. 5C, at time t3, glyphs 204a-204c (e.g., YES) are shown in the FOV of the spectator avatar 102'. As illustrated in FIG. 5D, at time t4, glyphs 204a-204c (e.g., YES) are shown in the FOV of the spectator avatar 102' and are at a position more proximate to the soccer field. As illustrated in FIG. 5E, at time t5, glyphs 204c-204h (e.g., S SANGA) are shown in the FOV of the spectator avatar 102'. As illustrated in FIG. 5F, at time tn, glyphs 204f-204h (e.g., NGA) are shown in the FOV of the spectator avatar 102'. In some embodiments, each of the glyphs 204a-204h may be configured to have a specific shape, size, font, color, thickness, etc. In some embodiments, each glyph 204 may have a weighting parameter or material properties associated with the glyph. For example, if the glyphs are assigned a weighting value and are made out of polymer, when the glyphs 204a-204h collide with the surface of the field, the glyphs 204f-204h may react in a manner that is consistent with the laws of physics, e.g., bounce, roll, slide, or interact with other game assets or objects in a scene, etc.

Figure 6:
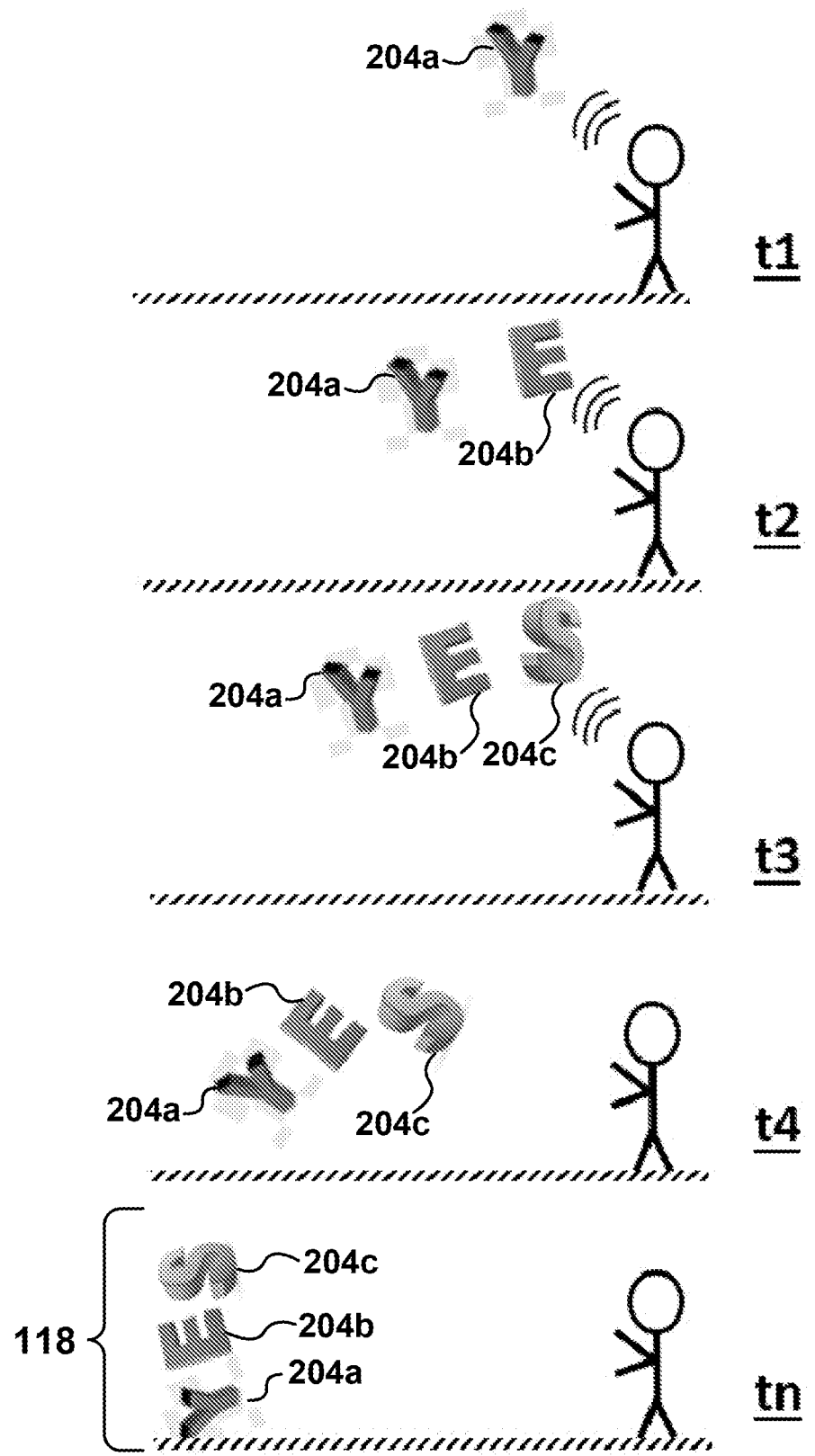
FIG. 6 illustrate text images represented by a plurality of letters independently floating toward a game scene, in accordance with an implementation of the disclosure.

FIG. 6 illustrates a text image representing the walla produced by a spectator which is represented by glyphs 204a-204c independently floating toward a game scene. As noted above, when a spectator 102 speaks and produces walla, a text image representing the walla is directed in the FOV of the spectator avatar 102'. In the illustrated example, FIG. 6 illustrates the spectator avatar 102' verbally expressing the word, "Yes," which is represented by the text image 118. The text image 118 is represented by glyphs 204a-204c which can independently appear in the game scene and float toward the game scene at various points in time. For example, at time t1, the glyph 204a appears in the game scene and is represented by the letter "Y" and is in a 3-dimensional shape. At time t2, the glyph 204b appears in the game scene and is represented by the letter "E" and is in a 3-dimensional shape. At time t3, the glyph 204c appears in the game scene and is represented by the letter "S" and is in a 3-dimensional shape. As time progresses, the glyphs 204a-204c can independently float a specified distance before fading away or colliding with the ground under the influence of gravity. At time t4, the glyphs 204a-204c begin to fall in a direction toward the ground and impacts the floor at time tn.

In some embodiments, as the glyphs 204 independently floating toward a game scene, each glyph can independently rotate, spin, glide at a certain speed, or make any movements independently. In some embodiments, the glyphs 204 can be animated to represent the mood or emotion of the spectator 102 producing the walla. For example, if the spectator is feeling cold and anxious about the video game that they are viewing, the glyphs 204 may be animated to look like icicles to represent the spectator feeling cold. In some embodiments, as noted above, the glyphs 204 may be assigned material properties to represent the emotion of the spectator. Accordingly, when the glyphs 204 interact with objects in the gameplay, the glyphs 204 may react in a manner that is consistent with their material properties. For example, if a spectator is feeling irritable and weak, a glyph may be associated with a glass material to represent the emotion of the spectator. Accordingly, when the glyph collides with other objects in the game or impacts the floor, the glyph may shatter.

Figure 7:
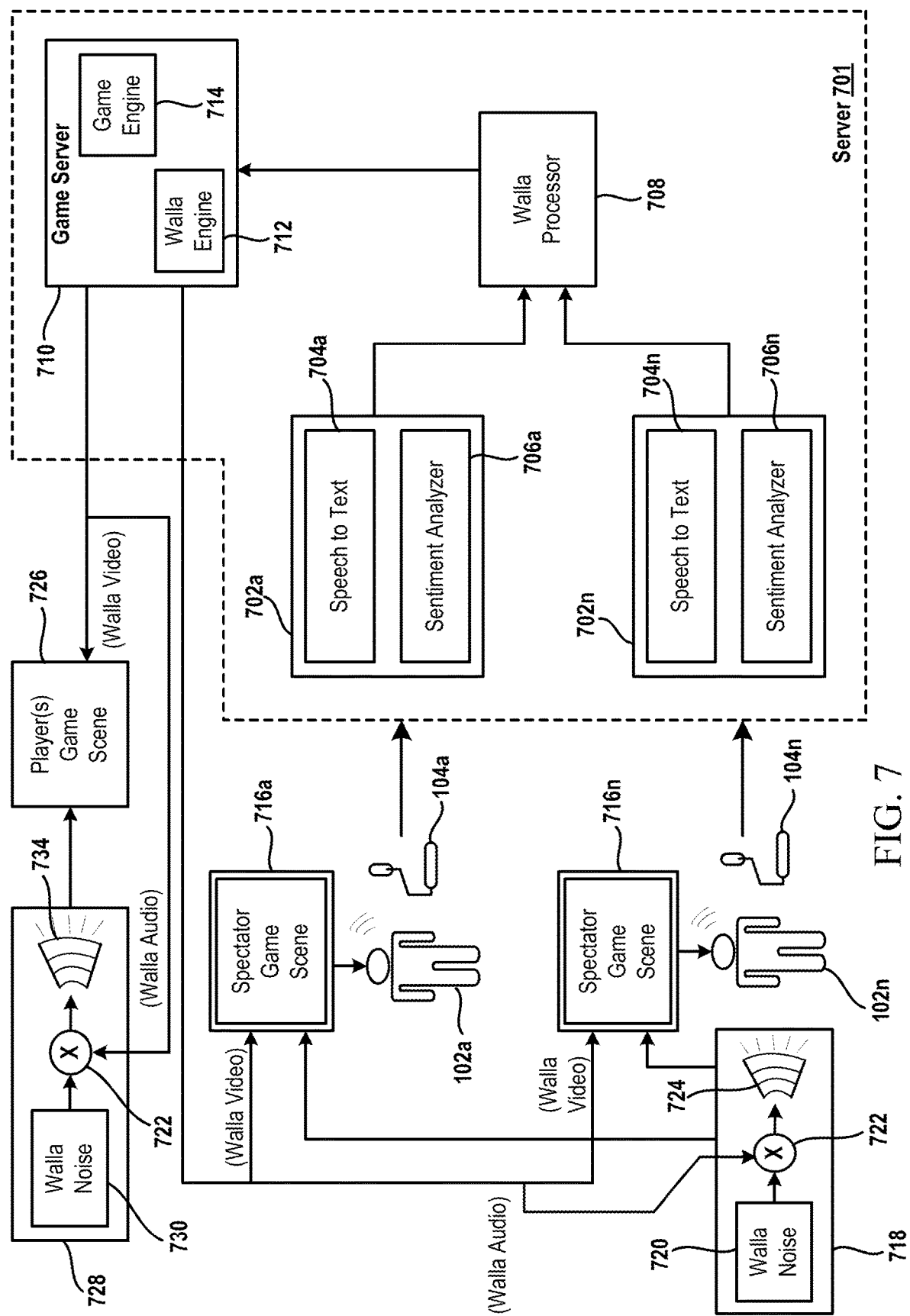
FIG. 7 illustrates an embodiment of a server receiving walla data from a plurality of spectators and processing the walla data to provide the spectators and the players with video streams that include text images representing the walla produced by the spectators, in accordance with an implementation of the disclosure.

FIG. 7 illustrates an embodiment of a server receiving walla data from a plurality of spectators 102 and processing the walla data to provide the spectators 102 and the players 106 with video streams that include text images representing the walla produced by the spectators 102. As shown in FIG. 7, the system includes a server 701 that is configured to receive walla (e.g., voice input) from a plurality of spectators 102a-102n. In one embodiment, the spectators 102a-102n may be viewing the gameplay of players 106a-106n playing a multiplayer online game. While viewing the gameplay, the spectators 102a-102n may support their team by verbally cheering and reacting to the actions occurring in the gameplay. In some embodiments, each spectator 102 may have a microphone 104 that is configured to capture the walla (e.g., voice input) of the spectators while the spectators view and verbally comment on the gameplay. In one embodiment, as each spectator is viewing the gameplay and producing walla, the walla can be received by server 701 which is configured to examine and process the walla of the spectators 102.

In one embodiment, the system includes a voice input processor 702 which can include a speech-to-text analyzer 704 and a sentiment analyzer 706. After processing the voice input of the spectators, the system may include a walla processor 708 that is configured to receive the voice input with its corresponding speech characteristics as inputs. After the walla processor 708 processes the voice input and the corresponding speech characteristics, a game server 710 may be configured to receive the output from the walla processor 708 and be configured to execute the gameplay which may include walla video and walla audio. Using the output of the game server 710, the system may provide each of the spectators 102a-102n and the players 106a-106n with a unique viewpoint of the gameplay which may include the walla video and the walla audio.

In one embodiment, while the spectators are viewing the gameplay of the players 106, the voice input processor 702 can be configured to receive the voice input data (e.g., walla) from the spectators 102a-102n. For example, the spectators 102a-102n may be watching the players 106a-106n compete in a live gaming event such as an E-sports event. While viewing the event, the spectators 102a-102n may support their favorite players and team by verbally expressing words of encouragement (e.g., Yes!, You can do it, Whoa nice move, etc.). The voice input of the spectators 102 can be captured by microphones 104 and sent to the voice input processor 702 to be examined.

In some embodiments, the voice input processor 702 may include a speech-to-text analyzer 704 and a sentiment analyzer 706. In one embodiment, the speech-to-text analyzer 704 is configured to convert the voice input of the spectator to text. In some embodiments, the conversion of speech to text is optional, and the voice input can be processed without conversion. In some embodiments, the sentiment analyzer 706 can be configured to examine the voice input of the spectator 102 using a machine learning model to identify various speech characteristics associated with the voice input. For example, the sentiment analyzer 706 can determine a sound intensity level, an emotion, and a mood associated with the voice input. In one embodiment, the sentiment analyzer 706 can be configured to identify, measure, or assign a sound intensity level for the voice input. In some embodiments, the sound intensity level associated with the voice input of the spectator can be based on the context of scene of the gameplay and the meaning of the words expressed by the spectator. In other embodiments, the machine learning model can be used to distinguish between the voice inputs of the various spectators.

In other embodiments, the sentiment analyzer 706 can be used to determine the emotion or mood associated with the voice input of the spectator. These emotions can include, without limitation, excitement, fear, sadness, happiness, anger, etc. For example, a spectator 102 may be watching a video game scene that involves their favorite player fighting against a "boss character" in order to advance onto the next level of the game. When the "boss character" is on the verge of winning, the spectator 102 yells out loud in support of the player, "Please don't give up." The sentiment analyzer 706 can process the voice input of the spectator and determine that the sound intensity level associated with the voice input has a value of '8' and that the spectator is emotionally nervous and anxious while viewing the fight scene.

In another embodiment, the walla processor 708 is configured to receive the output data from the voice input processor 702 as an input. In one embodiment, the walla processor 708 can be configured to use the noted inputs to determine the visual appearance of the text images 118 in the scene of the video game. For example, since the voice input of the spectator is converted to text, the walla processor 708 can use the letters from the text as a baseline to determine the appearance of the text images. In some embodiments, the voice input data may include various speech characteristics associated with the voice input of the spectator such as sound intensity levels and emotions. Accordingly, the walla processor 708 can organize the speech characteristics associated with the voice input for each spectator for further processing by game server 710.

In some embodiments, the game server 710 is configured to receive the output data from the walla processor 708. The output data from the walla processor 708 may include data that is used to determine the visual appearance of the text images 118 and other parameters associated with the dynamics of the text images 118 and how it may interact in the gameplay, e.g., distance projected, fade-away time, speed, etc. In one embodiment, the game server 710 may be configured to execute the active gameplay of the one or more players 106. In some embodiments, the game server 710 may include a walla engine 712 and a game engine 714 that are configured to work together to generate video streams (e.g., spectator video and a player video) that includes the text images 118. In one embodiment, the game server 710 is configured to provide the spectators and the players with access to the video streams in a distributed and seamless fashion. In one embodiment, the spectator video and the player video can be unique for each spectator and player. In particular, the spectator video and the player video may include a unique camera POV that is dynamically adjusted based on the preferences of each spectator and player.

In some embodiments, the walla engine 712 may use the known speech characteristics of the voice input to determine or assign additional speech characteristics to the corresponding voice input. In one example, these speech characteristics can include, without limitation, weight, size, thickness, distance projected, fade-away time, etc. In one example, when a spectator 102 yells out loud in support if a player, "Please don't give up," the sound intensity level of the voice input has a value of '8' and the spectator is emotionally nervous and anxious. Based on the sound intensity level and the emotional state of the spectator, the walla engine 712 may determine that the voice input (e.g., Please don't give up) may have a weighting value of '5,' a size value of '6,' a thickness value of '7,' and be projected a distance of 90 feet before fading away in 9 seconds.

In some embodiments, the game engine 714 can be configured to perform an array of functionalities and operations. In one embodiment, the game engine 714 can be configured to generate a spectator video and player video that includes the text images 118. In some embodiments, the game engine 714 may adjust the appearance of the text images based on the speech characteristics of the voice input. In other embodiments, using the speech characteristics of the voice input, the game engine 714 may be configured to perform game calculations and implement physics to determine how the text images 118 interacts and affects the gameplay, e.g., the directionality, distance projected, fade-time, etc.

In some embodiments, a walla noise processor 718 is configured to receive walla audio from the game server 710 for processing to determine an audio playback 724 to include in the game scenes of the spectator video stream. In one embodiment, the walla noise processor 718 may be configured to combine the existing walla noise 720 in the game scenes with the walla audio to generate the audio playback 724. In one embodiment, the walla noise 720 may be the noise from the gameplay and depend on what is occurring in the game scenes, e.g., background noise, crowd noise, noise from other characters in the game, etc. In some embodiments, the walla noise processor 718 may include a modulator 722 that is used to modulate the walla noise 720 and the walla audio to adjust the audio for a particular spectator 102. For example, a spectator that is viewing the gameplay of a soccer match that is seated on an upper terrace portion of the soccer stadium may have an audio playback 724 that is different than a spectator that is seated close to the soccer field. Accordingly, the modulator 722 can be configured to modulate the walla noise 720 and the walla audio to generate the generate the audio playback 724 so that it sounds realistic to the spectator and reflects the position and location of the spectator in the game scene.

In some embodiments, spectator game scenes 716a-716n may be presented to the spectators 102a-102n on a display of the spectator or on a separate device such as a monitor, or television or head mounted display, or portable device. In some embodiments, the spectator game scenes 716a-716n may include the audio playback generated by the walla noise processor 718 and the walla video from the game server 710. In some embodiments, the spectator game scenes 716a-716n may be unique for each spectator 102. For example, each spectator 102 may have a view of the gameplay based on the FOV of their corresponding avatar. In other embodiments, each spectator 102 may have a view that is based on the preferences of spectator or camera point of view that is dynamically adjusted to provide the spectator with the most optimal view of the gameplay and the text images appearing in the gameplay.

In some embodiments, walla noise processor 728 is configured to receive walla audio (e.g., voice input of spectators) from the game server 710 for processing to determine an audio playback 734 to include in the game scenes of the player video stream. In one embodiment, the walla noise processor 728 may be configured to combine the existing walla noise 728 in the game scenes with the walla audio to generate the audio playback 734. In some embodiments, the walla noise processor 728 may include a modulator 722 that is used to modulate the walla noise 728 and the walla audio to adjust the audio for a particular player 106. In some embodiments, the player game scenes 726 may be presented to the players 106a-106n on a display of the players 106 on a separate device such as a monitor, or television, or head mounted display, or portable device. In some embodiments, the player game scenes 726 may include the audio playback generated by the walla noise processor 728 and the walla video generated by the game server 710. In some embodiments, the player game scenes 726 may be unique for each player 106 which provides each player with a unique view of the gameplay.

Figure 8:
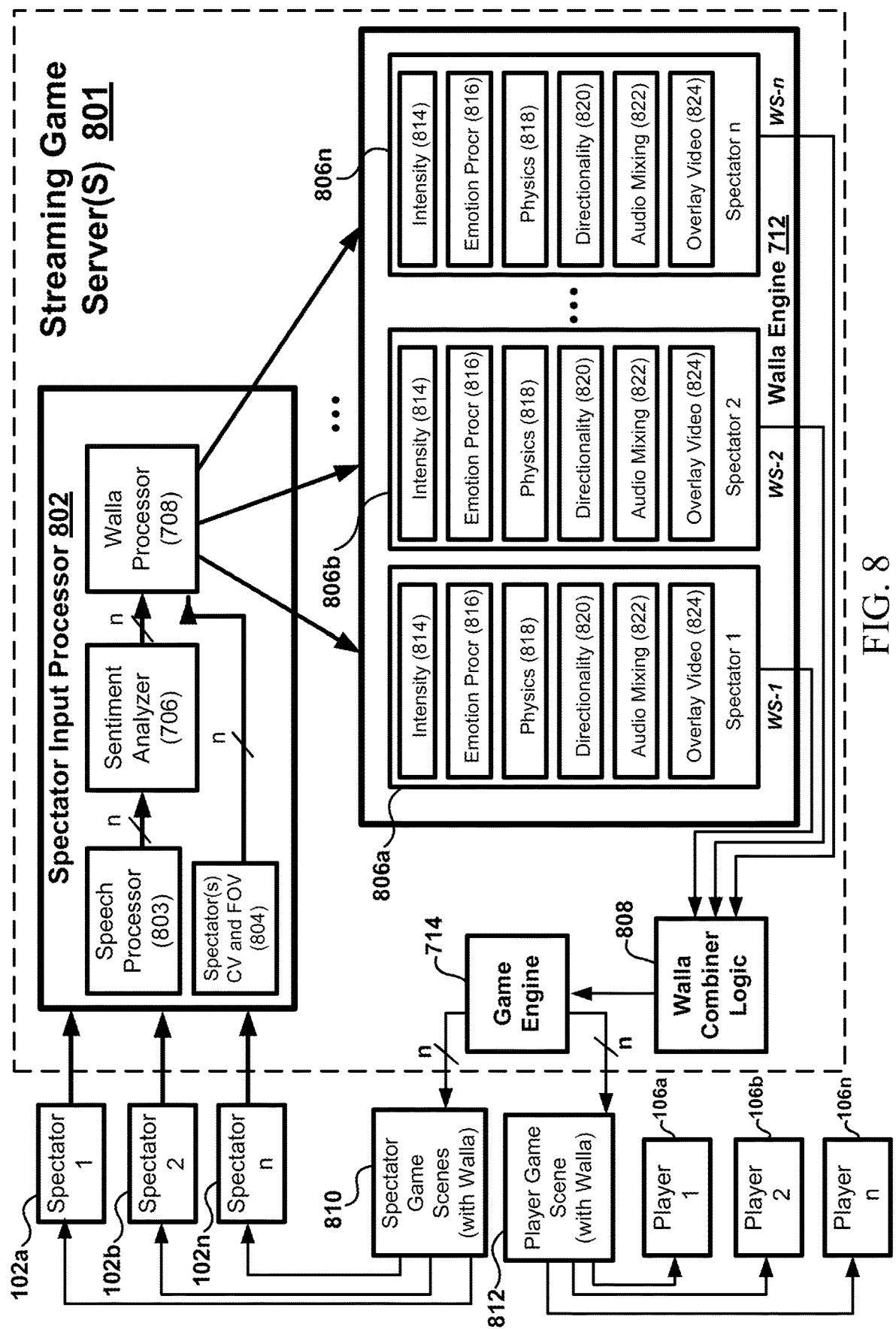
FIG. 8 illustrates an embodiment of a streaming game server receiving spectator walla data captured from a plurality of spectators and processing the walla data to provide the spectators and players with video streams that include text images representing the walla, in accordance with an implementation of the disclosure.

FIG. 8 illustrates an embodiment of a streaming game server 801 receiving spectator walla data (e.g. spectator voice input) captured from a plurality of spectators 102a-102n and processing the walla data to provide the spectators 102 and players 106 with video streams that include text images representing the walla. In some embodiments, the streaming game server 801 is configured to examine and process the spectator walla data to provide the spectators 102a-102n and the players 106a-106n with video streams that includes text images 118 representing the walla of the spectators. In one embodiment, the spectators 102 may be viewing and verbally reacting to the gameplay of players 106 playing a multiplayer online game. In some embodiments, as the spectators 102 produce walla in response to the gameplay, the walla can be received by server 801 in real-time which is examined and processed by various processors and operations of the system.

In some embodiments, the system may include a spectator input processor 802 that is configured to receive the voice input of the spectators 102 and examine the voice input. After examining the voice input of the spectators, the system may include a walla engine 712 that is configured to process the voice input of the spectators to generate a walla video stream (e.g., WS-1, WS-2, WS-n) for each of the spectators 102. After the walla engine 712 generates the walla video streams, a walla combiner logic 808 is configured to combine the walla video streams and determine the respective camera point of views for each spectator 102. Using the output of the walla combiner logic 808, a game engine 714 can be configured to execute the gameplay and generate spectator and player video streams which can be provided to the spectators 102 and the players 106 in real-time.

In some embodiments, the spectator input processor 802 may include a speech processor 803, a sentiment analyzer 706, a walla processor 708, and an operation 804 that is configured to determine the camera POV and FOV of the spectator 102. In one embodiment, the speech processor 803 can be configured to analyze the voice input of each spectator and convert the voice input to text. Accordingly, the converted text can be used as a baseline to determine the visual appearance of the text images that represent the voice input. As noted above, in some embodiments, the sentiment analyzer 706 can be configured to examine the voice input of the spectator using a machine learning model to identify speech characteristics associated with the voice input, e.g., sound intensity level, weighting, emotion and mood associated with the voice input, etc.

In some embodiments, operation 804 can be configured to determine the camera POV and of the spectator 102. In one embodiment, the camera POV may be dynamically adjusted throughout the progression of the gameplay to provide each of the spectators 102 with the most optimal view into the video game. In some embodiments, the camera POV may be based on the preferences of the spectator 102 or be adjusted to focus on certain aspects of the gameplay. For example, a spectator may have a preference to have a camera POV from a bird's-eye-view so that the spectator can see the gameplay of all the players competing in the video game. In other embodiments, operation 804 can be configured to determine the FOV of the spectator 102 and the spectator avatar 102'. While watching the gameplay, the spectator 102 may focus their attention specific aspects of the gameplay which is continuously monitored by operation 804. As a result, the gaze direction and the FOV of the spectator avatar 102' is continuously tracked and monitored throughout the progression of the gameplay by operation 804.

In some embodiments, the walla processor 708 can receive as inputs the results from the speech processor 803, operation 804, and the sentiment analyzer 706 to determine the visual appearance of text images 118 representing the walla produced by the spectators 102. In some embodiments, the walla processor 708 may organize the speech characteristics associated with the voice input for each spectator and distribute the data to the walla engine 712.

In some embodiments, the walla engine 712 may include walla video stream generators 806a-806n that are configured to receive data from the walla processor 708 and generate spectator video streams (e.g., WS-1, WS-2, WS-n) for the spectators 102. In one embodiment, each spectator video stream may include text images 118 representing the voice input produced by the respective spectator 102. In some embodiments, each walla video stream generator 806 may include one or more operations that may work together generate the spectator video streams. In one embodiment, each walla video stream generator 806 may include an intensity operation 814, an emotion processor 816, a physics operation 818, a directionality operation 820, an audio mixing operation 822, and an overlay video operation 824.

In some embodiments, the intensity operation 814 is configured to process the sound intensity level associated with the voice input of the spectator which can be used to determine the visual appearance of the text images 118. In one embodiment, based on the sound intensity level of the voice input, the intensity operation 814 can determine the specific shape, size, font, color, thickness, or any other physical feature that can contribute to the overall visual appearance of the text image. In some embodiments, based on the sound intensity level of the voice input, the intensity operation 814 can determine various ways to animate the text images, e.g., flames, lightning bolts, icicles, etc. In other embodiments, the intensity operation 814 may be configured to adjust the sound intensity level based on context of the gameplay. For example, during a penalty shoot-out in FIFA World Cup finals game, a spectator yells, "I believe in you Japan." In this example, the intensity operation 814 may take into consideration the context of the gameplay (e.g., penalty shoot-out, finals game) and increase the sound intensity level since it is a climactic point in the gameplay.

In some embodiments, the emotion processor 816 is configured to process the emotion associated with the voice input of the spectator to determine the visual appearance of the text images 118. In one embodiment, using the emotion associated with the voice input, the emotion processor 816 can determine the colors of the text images 118. For example, if the voice input of the spectator is associated with an emotion of happiness, the emotion processor 816 may determine that the corresponding text image is the color green. In another example, if the voice input of the spectator is associated with an angry emotion, the emotion processor 816 may determine that the corresponding text image is the color red.

In some embodiments, the physics operation 818 may implement physics to determine how the text images 118 interacts and affects the gameplay. In one embodiment, the physics operation 818 may use the weighting associated with the voice input of the spectator to determine how the text images 118 interacts with the gameplay, e.g., distance projected, fade-time, speed, bounce, twist, deform, slide, etc. Since the text images can be associated with a physics parameter, this enables the text images to graphically impact an object in the game scene. For example, a first text image associated with a first spectator may have a larger weighting than a second text image associated with a second spectator. When the first text image and the second text image collide against one another, the first text image may cause the second image to deflect a specified distance away from the point of collision because the weighting of the first text image is larger than the weighting of second text image. In another example, based on the sound intensity level and emotion of the voice input, the physics operation 818 can determine the speed and adjustments in speed of the corresponding text images 118 when it graphically moves in toward a game scene. In general, a voice input having a sound intensity level that is greater than other voice inputs may have corresponding text images that move at greater speeds.

In some embodiments, the directionality operation 820 may determine the path and direction the text image 118 floats within the scene of the gameplay. In one embodiment, the directionality operation 820 may determine that the text image 118 travels toward a direction that the spectator avatar is facing. In one example, the text image 118 may float along the path of the gaze direction of the spectator avatar and would stay within range of the POV of the spectator avatar.

In some embodiments, the audio mixing operation 822 can incorporate the voice input produced by the spectator with the existing audio from the gameplay to produce an audio playback which can be included in the spectator video stream (e.g., WS-1, WS-2, WS-n). In some embodiments, the audio mixing operation 822 can adjust the audio playback so that it corresponds to where the spectator avatar is positioned in the scene of the gameplay. For example, a spectator avatar that is seated in a section of a soccer stadium that has a higher concentration of spectators may have an audio playback that is different than a spectator avatar that is seated in a luxurious section of the stadium where the spectators are more spread out and less concentrated.

In some embodiments, the overlay video operation 824 may be configured to combine the results of the noted operations (e.g., 814, 816, 818, 820, 822) to produce a spectator video that includes text images representing the voice input of the spectator. In one embodiment, the overlay video operation 824 can combine a video game video with the spectator video produce an overlay of the text images graphically moving in toward a game scene provided by the video game video.

In some embodiments, a walla combiner logic 808 can receive the one or more spectator video streams (e.g., WS-1, WS-2, WS-n) as inputs. Since multiple spectator video streams are generated and each spectator video stream corresponds to a particular spectator, the walla combiner logic 808 is configured to combine all of the spectator video steams so that all of text images can be combined into a single spectator video stream. This will allow the spectators to have a combined view of all of the text images that represent the voice input of all of the spectators. In some embodiments, using a camera POV associated with a spectator, the walla combiner logic 808 can provide a spectator with a view of the gameplay based on the camera POV. In some embodiments, the walla combiner logic 808 can be configured to provide the spectators with a unique view into the gameplay that is based on their personal preferences.

In some embodiments, the game engine 714 can receive the combined spectator video stream from the walla combiner logic 808 as an input. As noted above, the game engine 714 can be configured to perform an array of functionalities and operations. In one embodiment, the game engine 714 can be configured to make any additional adjustments to the appearance of the text images to produce spectator game scenes (e.g., 810) that can be viewed by the spectators 102. In another embodiment, using the spectator video stream, the game engine 714 can generate players game scenes (e.g., 812) that can be viewed by the players playing the video game.

FIG. 9A illustrates an embodiment of a speech intensity table 902 illustrating various walla (e.g. voice input) produced by a plurality of spectators while viewing the gameplay of the players 106. As shown, the speech intensity table 902 includes a spectator identification 904 and the walla 906 produced by the spectators at a specific point in time, e.g., t1-tn. In some embodiments, after the system examines the respective walla of a spectator, each walla 906 may include various speech characteristics 905 such as a sound intensity level 908, a weighting 910, a size 912, a thickness 914, a distance projected 916, and a fade-time 918.

As illustrated in FIG. 9A, each walla 906 may have a corresponding sound intensity level 908 that can range from 0-10. In general, the sound intensity level is associated with the loudness of the sound that can be perceived by a person. In other embodiments, the sound intensity level 908 may be based on the mood or emotion of the spectator 102 and the context of the gameplay. In some embodiments, the sound intensity level 908 can cause changes in size of the text images 118. In one embodiment, walla with a sound intensity level of '10' may affect the visual appearance of the corresponding text image such that the text images corresponding to the walla significantly stands out in the scene of the video game. For example, a walla with a sound intensity level of '10' may result in the corresponding text image having bright colors, and larger in size relative to the other text images. Conversely, a walla with a sound intensity level of '1' may have a corresponding text image that is unnoticeable in the scene of the game scene, e.g., transparent, small size, faint, etc.

In some embodiments, the sound intensity level 908 may be used to determine the weighting 910 associated with the walla and its corresponding text image. In some embodiments, the weighting 910 can range from 0-10. Generally, the greater the weighting that is associated with the walla, the greater the impact and affect the corresponding text image of the walla may have on the gameplay. For example, if a text image with a weighting value of '10' collides with an object in game scene that has a weighting value of '3,' the object may be deflected a certain distance away from the text image or may be damaged by the text image. Conversely, a text image having a weight value of '1' may have an insignificant effect on the game scene and may not deflect or damage objects in the game scene when colliding with objects in the game.

In some embodiments, the size 912 associated with the walla and its corresponding text image may be based on the sound intensity level 908 of the walla. In one embodiment, the size 912 of the text image can range from 0-10. Generally, the greater the size that is associated with the walla and its corresponding text image, the larger the stature the text image may appear in the game scene. In some embodiments, the sound intensity level 908 associated with a walla may be used to determine the thickness 914 associated with the walla and its corresponding text image. In one embodiment, the thickness 914 can range from 0-10 and may provide depth and allow the text image to appear in 3-dimensional.

In some embodiments, the distance that a text image is projected (e.g., distance projected 916) and the time it takes the text image to fade away (e.g., fade-time 918) may be based on the sound intensity level 908 of the walla. For example, as illustrated in FIG. 9A, at time tn, spectator 3 verbally expresses "I believe in you Antlers." The system may determine that the that spectator 3 is feeling nervous and that the sound intensity level of the walla has a value of '2.' Accordingly, based on the sound intensity level and emotion associated with the walla produced by spectator 3, the system may determine that the walla has a weighting value of '1,' a size value of '2,' a thickness value of '1,' and be projected a distance of 5 feet before fading away in 4 seconds. In other embodiments, a developer or designer of the video game may assign specific values to the speech characteristics associated with the walla, assign specific colors to the text images, or determine other features that may impact the visual appearance of the corresponding text images.

FIG. 9B illustrates an embodiment of an emotion to color mapping table 920 which can be used to determine the color of the text images 118 representing the walla. In some embodiments, the color of the text images 118 may be based on various factors such as the mood, emotion, and the sound intensity of the walla. As illustrated in FIG. 9B, the emotion to color mapping table 920 includes an emotion category 922, emotion type 924, and a recommended color 926. For example, when a spectator verbally yells, "Horrible call," the system may determine that the spectator is upset with a bad decision made by a referee in the soccer match. Accordingly, based on the emotion to color mapping table 920, the system may determine that the color of the text image corresponding to the walla (e.g. Horrible call) is red. Hence, in some embodiments, the mood in the voice input of the spectator can be processed to set color changes in the text images 118. In some embodiments, the speech intensity table 902 of FIG. 9A and the emotion to color mapping table 920 of FIG. 9B can be used on conjunction to determine the visual appearance of the text images 118.

Figure 10:
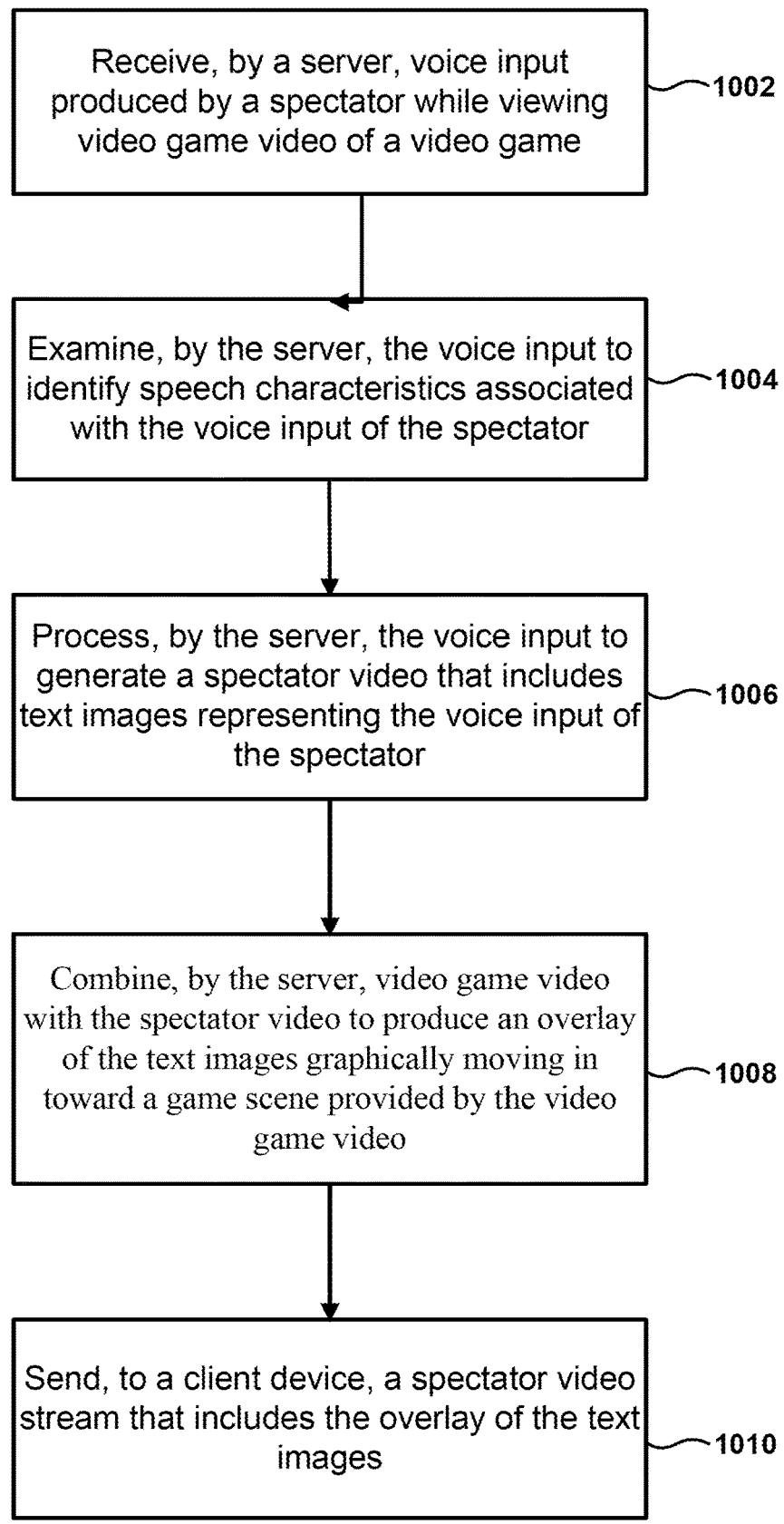
FIG. 10 illustrates a method for displaying voice input of a spectator in a video game, in accordance with an implementation of the disclosure.

FIG. 10 illustrates a method for displaying voice input of a spectator in a video game. In one embodiment, the method includes an operation 1002 that is configured to receive, by a server, voice input (e.g., walla) produced by a spectator 102 while viewing video game video of the video game. For example, while viewing the gameplay of the players 106, the spectators 102 may verbally react to the gameplay which may include the spectators talking, signing, laughing, crying, screaming, shouting, yelling, etc. In some embodiments, operation 1002 can simultaneously capture the voice input from a plurality of spectators 102 and be able to distinguish the voice input of each spectator. In other embodiments, in lieu of providing voice input, the spectators 102 can provide their comments to the gameplay by typing it via a keyboard or any other type of device which can be received and processed by operation 1002.

The method shown in FIG. 10 then flows to operation 1004 where the operation is configured to examine, by the server, the voice input to identify speech characteristics associated with the voice input of the spectator 102. As noted above, the voice input may include various speech characteristics such as a sound intensity level, a weighting, a size, a thickness, a distance projected, and a fade-time. In some embodiments, operation 1004 can be configured to determine the emotion and mood associated with the voice input that is produced by the spectator. In one example, operation 1004 may be configured to determine whether the spectator is happy, excited, scared, angry, etc. when the spectator speaks and produces walla.

The method flows to operation 1006 where the operation is configured to process, by the server, the voice input to generate a spectator video that includes text images representing the voice input of the spectator. In some embodiments, the speech characteristics associated with the voice input of the spectator can be used to determine the visual appearance of the text images. In other embodiments, the text images representing the voice input of the spectator may include various letters, symbols, marks, emoticons, etc. that are used to collectively represent the text images.

The method shown in FIG. 10 then flows to operation 1008 where the operation is configured to combine, by the server, video game video with the spectator video to produce an overlay of the text images graphically moving in toward a game scene provided by the video game video. For example, the video game video may include scenes of a soccer match where a goalkeeper prevented the opposing team from scoring. The spectator video may include text images representing the voice input (e.g., good job, yes, great defense, etc.) of various spectators being projected from the avatars of the spectators to depict the spectator's avatars celebrating the blocked shot by the goalkeeper. Operation 1008 can combine the video game video and the spectator video to produce an overlay showing the spectator avatars celebrating the blocked shot with the respective text images floating and moving in the game scene.

In another embodiment, operation 1008 is configured to associate, by the server, the video game video with the spectator video to enable generation of an overlay of the text images graphically moving in toward a game scene provided by the video game video. For example, associating the video game video with the spectator video can allow spectators 102 or the players 106 to reproduce the game scenes and the overlay of the text images locally at their respective client devices.

The method shown in FIG. 10 then flows to operation 1010 where the operation is configured to send, to a client device, a spectator video stream that includes the overlay of the text images. In some embodiments, the spectator video stream can be adjusted to provide each spectator or player with a unique viewpoint of the gameplay. In one embodiment, the spectator video stream can be viewed by the spectators on a display of the spectator or on a separate device such as a monitor, or television, or head mounted display, or portable device.

In another embodiment, instead of sending to a client device a spectator video stream that includes the overlay of the text images, operation 1010 is configured to enable a client device of the spectator 102 or the player 106 to render the spectator video stream at their respective client devices. In one embodiment, the client device of the spectator 102 or the player 106 can receive, by the server, the association of the video game video and the spectator video so that the spectator video stream can be produced by the client device of the spectator 102 or the player 106. For example, in a massively multiplayer online (MMO) game, each spectator 102 and player 106 can receive or access the associated video game video and the spectator video so that the spectator video stream can be rendered locally at their respective client devices. In one embodiment, the client device of the spectator 102 may receive the video game video and then subsequently receive the overlay of the text images to enable locally rendering of the spectator video stream at the client device.

Figure 11:
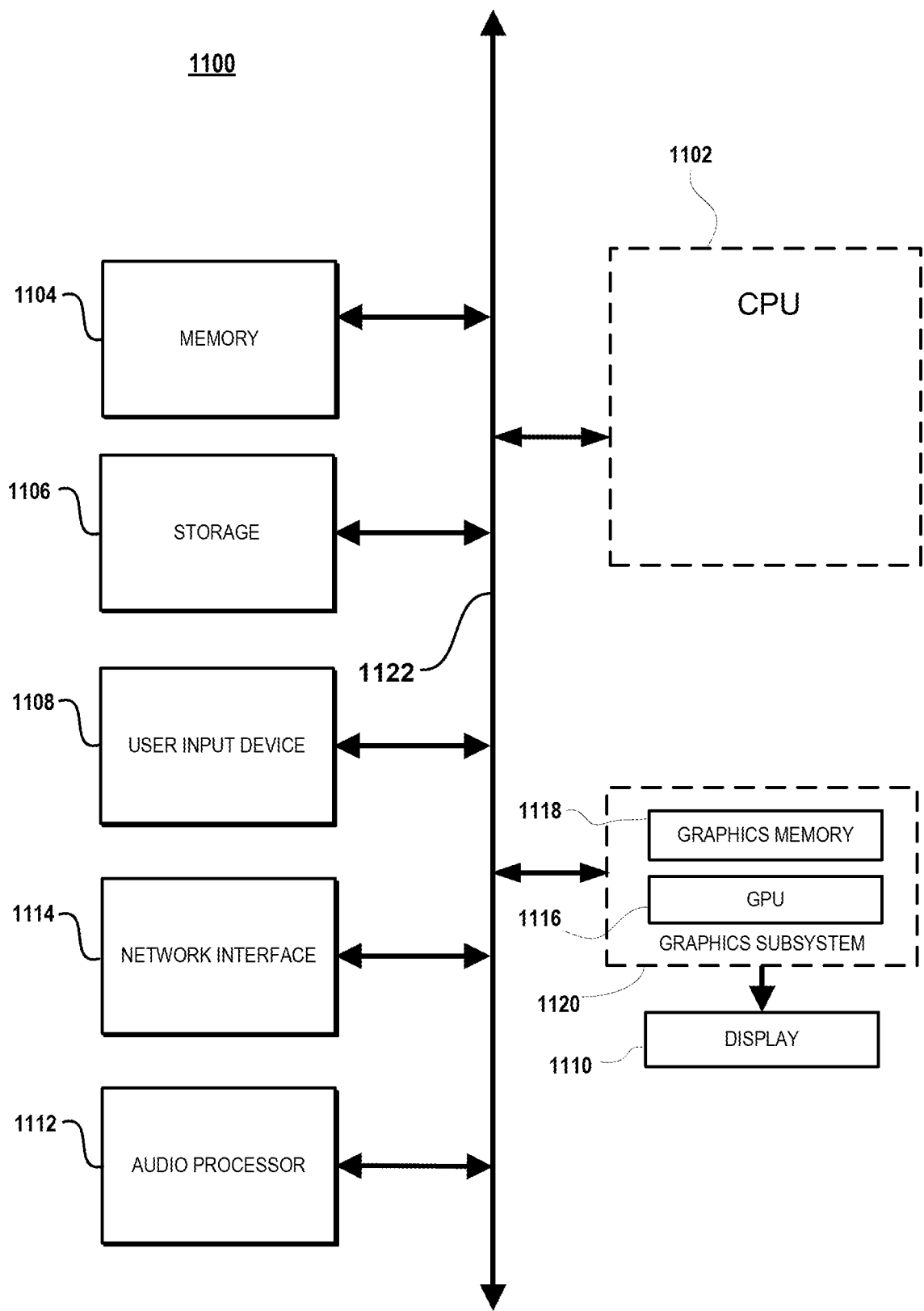
FIG. 11 illustrates components of an example device that can be used to perform aspects of the various embodiments of the present disclosure.

FIG. 11 illustrates components of an example device 1100 that can be used to perform aspects of the various embodiments of the present disclosure. This block diagram illustrates a device 1100 that can incorporate or can be a personal computer, video game console, personal digital assistant, a server or other digital device, suitable for practicing an embodiment of the disclosure. Device 1100 includes a central processing unit (CPU) 1102 for running software applications and optionally an operating system. CPU 1102 may be comprised of one or more homogeneous or heterogeneous processing cores. For example, CPU 1102 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 1100 may be a localized to a player playing a game segment (e.g., game console), or remote from the player (e.g., back-end server processor), or one of many servers using virtualization in a game cloud system for remote streaming of gameplay to clients.

Memory 1104 stores applications and data for use by the CPU 1102. Storage 1106 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 1108 communicate user inputs from one or more users to device 1100, examples of which may include keyboards, mice, joysticks, touch pads, touch screens, still or video recorders/cameras, tracking devices for recognizing gestures, and/or microphones. Network interface 1114 allows device 1100 to communicate with other computer systems via an electronic communications network, and may include wired or wireless communication over local area networks and wide area networks such as the internet. An audio processor 1112 is adapted to generate analog or digital audio output from instructions and/or data provided by the CPU 1102, memory 1104, and/or storage 1106. The components of device 1100, including CPU 1102, memory 1104, data storage 1106, user input devices 1108, network interface 1110, and audio processor 1112 are connected via one or more data buses 1122.

A graphics subsystem 1120 is further connected with data bus 1122 and the components of the device 1100. The graphics subsystem 1120 includes a graphics processing unit (GPU) 1116 and graphics memory 1118. Graphics memory 1118 includes a display memory (e.g., a frame buffer) used for storing pixel data for each pixel of an output image. Graphics memory 1118 can be integrated in the same device as GPU 1108, connected as a separate device with GPU 1116, and/or implemented within memory 1104. Pixel data can be provided to graphics memory 1118 directly from the CPU 1102. Alternatively, CPU 1102 provides the GPU 1116 with data and/or instructions defining the desired output images, from which the GPU 1116 generates the pixel data of one or more output images. The data and/or instructions defining the desired output images can be stored in memory 1104 and/or graphics memory 1118. In an embodiment, the GPU 1116 includes 3D rendering capabilities for generating pixel data for output images from instructions and data defining the geometry, lighting, shading, texturing, motion, and/or camera parameters for a scene. The GPU 1116 can further include one or more programmable execution units capable of executing shader programs.

The graphics subsystem 1114 periodically outputs pixel data for an image from graphics memory 1118 to be displayed on display device 1110. Display device 1110 can be any device capable of displaying visual information in response to a signal from the device 1100, including CRT, LCD, plasma, and OLED displays. Device 1100 can provide the display device 1110 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet.

It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g. prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g. accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g. accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g. feedback data) from the client device or directly from the cloud gaming server.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method for displaying voice input of a spectator in a video game, comprising:
   receiving, by a server, the voice input produced by the spectator while viewing video game video of the video game;
   examining, by the server, the voice input to identify speech characteristics associated with the voice input of the spectator;
   processing, by the server, the voice input to generate a spectator video that includes text images representing the voice input of the spectator, the text images are configured to be adjusted in visual appearance based on the speech characteristics of the voice input, wherein the text images are directed in a field of view of an avatar of the spectator;
   combining, by the server, the video game video with the spectator video to produce an overlay of the text images graphically moving in toward a game scene provided by the video game video; and
   sending, to a client device, a spectator video stream that includes the overlay of the text images;
   wherein the speech characteristics identify intensity in the voice input and the intensity is configured to cause changes in weighting of the text images, wherein weighting sets an impact said text images have with objects in the game scene.

2. The method of claim 1, wherein the intensity is configured to cause changes in size of the text images.

3. The method of claim 1, wherein the speech characteristics further identify mood in the voice input.

4. The method of claim 3, wherein the mood in the voice input is processed to set a color change in said text images.

5. The method of claim 1, wherein the text images are additionally adjusted in speed when caused to graphically move in toward the game scene.

6. The method of claim 1, wherein the text images are additionally adjusted in a fade-time when caused to graphically move in toward the game scene.

7. The method of claim 1, wherein the spectator video stream includes a plurality of overlays that graphically illustrate a plurality of text images directed toward the game scene, the plurality of text images are processed to float toward the game scene from a plurality of locations associated with avatars viewing the game scene.

8. The method of claim 7, wherein each of the text images represent words, and each word having one or more letters, and wherein each of the one or more letters are caused to independently float toward the game scene.

9. The method of claim 8, wherein the one or more letters are associated with a physics parameter that enables said one or more letters to graphically impact an object of the game scene.

10. The method of claim 9, wherein said impact of the object of the game scene by said one or more letters is adjustable based on a weighting parameter associated to respective ones of said text images.

11. The method of claim 1, wherein in addition to the voice input from the spectator, further comprising:
receiving, by the server, a plurality of voice inputs from a plurality of spectators; examining, by the server, the plurality of voice inputs to identify corresponding speech characteristics of the plurality of spectators;
processing, by the server, the plurality of voice inputs to produce corresponding text images directed in a field of view of respective avatars of the plurality of spectators;
combining, the video game video with spectator video from the plurality of spectators to produce overlays of the text images; and
sending, to a plurality of clients, the spectator video stream that includes the overlays from the plurality of spectators.

12. The method of claim 1, further comprising:
generating, by the server, a player video that includes the text images representing the voice input of the spectator;
combining, by the server, the video game video with the player video; and
sending, to a device of a player, a player video stream that includes the video game video with the player video.

13. A method for displaying a plurality of voice inputs of a plurality of spectators of a video game, comprising:
receiving, by a server, the plurality of voice inputs produced by the plurality of spectators;
examining, by the server, the plurality of voice inputs to identify corresponding speech characteristics of the plurality of spectators;
processing, by the server, the plurality of voice inputs to generate a spectator video that includes corresponding text images directed a field of view of respective avatars of the plurality of spectators;
combining, video game video with the spectator video to produce overlays of the corresponding text images; and
sending, to a plurality of client devices, a spectator video stream that includes the overlays of the corresponding text images;
wherein the corresponding text images represent words spoken by the plurality of spectators, each word having one or more letters, and wherein each letter caused to independently float toward a game scene provided by the video game video.

14. The method of claim 13, wherein the speech characteristics identify intensity in the plurality of voice inputs, said intensity to cause changes in size of the corresponding text images.

15. The method of claim 13, wherein the corresponding text images are configured to be adjusted in visual appearance based on the corresponding speech characteristics of the plurality of spectators.

16. The method of claim 13, wherein the corresponding speech characteristics identify mood in the in the plurality of voice inputs, said mood is processed to set a color change in said corresponding text images.

17. The method of claim 13, wherein each of the one or more letters is associated with a physics parameter that enables the one or more letters to graphically impact an object in the game scene.

18. A method for displaying voice input of a spectator in a video game, comprising:
receiving, by a server, the voice input produced by the spectator while viewing video game video of the video game;
examining, by the server, the voice input to identify speech characteristics associated with the voice input of the spectator;
processing, by the server, the voice input to generate a spectator video that includes text images representing the voice input of the spectator, the text images are configured to be adjusted in visual appearance based on the speech characteristics of the voice input, wherein the text images are directed in a field of view of an avatar of the spectator;
associating, by the server, the video game video with the spectator video to enable generation of an overlay of the text images graphically moving in toward a game scene provided by the video game video; and
enabling a client device of the spectator to render a spectator video stream that includes the video game video along with the overlay of the text images;
wherein the video game video is received by the client device of the spectator and then receives the overlay of the text images to enable locally rendering of the spectator video stream at the client device.

19. The method of claim 18, wherein the client device is sent by the server the association of the video game video and the spectator video to enable the client device to render the spectator video stream.

\* \* \* \* \*